(12) United States Patent
Hartfield, Jr.

(10) Patent No.: US 8,037,863 B2
(45) Date of Patent: Oct. 18, 2011

(54) POSITIVE DISPLACEMENT ROTARY VANE ENGINE

(76) Inventor: Roy J. Hartfield, Jr., Auburn, AL (US)

( * ) Notice: Subject to any disclaimer, the term of this patent is extended or adjusted under 35 U.S.C. 154(b) by 398 days.

(21) Appl. No.: 12/043,066

(22) Filed: Mar. 5, 2008

(65) Prior Publication Data

US 2008/0216792 A1    Sep. 11, 2008

Related U.S. Application Data

(60) Provisional application No. 60/892,913, filed on Mar. 5, 2007.

(51) Int. Cl.
*F02B 53/00* (2006.01)
*F02C 3/00* (2006.01)
*F01C 21/10* (2006.01)

(52) U.S. Cl. .......................... 123/243; 60/39.6; 418/150

(58) Field of Classification Search .................. 123/243; 60/39.6, 36.62, 39.63; 418/150
See application file for complete search history.

(56) References Cited

U.S. PATENT DOCUMENTS

| | | | | |
|---|---|---|---|---|
| 2,491,351 A | * | 12/1949 | Zeitlin | 418/150 |
| 2,724,341 A | * | 11/1955 | Bilas | 418/111 |
| 3,301,233 A | * | 1/1967 | Dotto et al. | 123/243 |
| 3,548,790 A | * | 12/1970 | Pitts | 123/243 |
| 3,743,451 A | * | 7/1973 | Chapman | 418/61.1 |
| 3,883,277 A | | 5/1975 | Keller | |
| 3,929,105 A | | 12/1975 | Chisholm | |
| 3,951,112 A | | 4/1976 | Hunter | |
| 3,971,346 A | | 7/1976 | McReynolds | |
| 4,018,191 A | | 4/1977 | Lloyd | |
| 4,134,382 A | | 1/1979 | Southard | |
| 4,178,902 A | | 12/1979 | Ganley | |
| 4,241,713 A | | 12/1980 | Crutchfield | |
| 4,353,337 A | | 10/1982 | Rosaen | |
| 4,403,581 A | | 9/1983 | Rogachevsky | |
| 4,418,663 A | | 12/1983 | Bentley | |
| 4,507,067 A | * | 3/1985 | Hansen | 418/105 |
| 4,556,372 A | * | 12/1985 | Leroy et al. | 418/150 |
| 5,181,490 A | | 1/1993 | Ruzic | |
| 5,224,850 A | * | 7/1993 | Pie | 418/111 |

(Continued)

FOREIGN PATENT DOCUMENTS

JP    51-085024    7/1976

(Continued)

OTHER PUBLICATIONS

The Engineering ToolBox, "Thermal Expansion Metals", http://www.engineeringtoolbox.com/thermal-expansion-metals-d_859.html, Printed from the website on Apr. 25, 2010, pp. 1-4.*

(Continued)

*Primary Examiner* — Mary A Davis
(74) *Attorney, Agent, or Firm* — Gardner Groff Greenwald & Villanueva, PC

(57) ABSTRACT

The present invention is an engine, which includes a positive displacement compression process, a variably fueled, continuous combustor and/or heat exchanger, and a positive displacement, work-producing expander. This arrangement avoids the traditional stochiometric mixture requirements utilized in spark-ignition based engines and the emission problems associated with diesel engines.

18 Claims, 19 Drawing Sheets

U.S. PATENT DOCUMENTS

| | | | |
|---|---|---|---|
| 5,277,158 A | 1/1994 | Pangman | |
| 5,375,987 A | 12/1994 | Brent | |
| 5,415,141 A * | 5/1995 | McCann | 123/243 |
| 5,423,297 A * | 6/1995 | Roberts | 123/213 |
| 5,427,068 A | 6/1995 | Palmer | |
| 5,489,199 A | 2/1996 | Palmer | |
| 5,522,356 A * | 6/1996 | Palmer | 60/39.6 |
| 5,524,587 A | 6/1996 | Mallen et al. | |
| 5,568,796 A | 10/1996 | Palmer | |
| 5,711,268 A | 1/1998 | Holdampf | |
| 5,758,617 A | 6/1998 | Saito | |
| 6,070,565 A | 6/2000 | Miniere | |
| 6,125,814 A | 10/2000 | Tang | |
| 6,244,240 B1 | 6/2001 | Mallen | |
| 6,257,195 B1 | 7/2001 | Vanmoor | |
| 6,283,087 B1 | 9/2001 | Isaksen | |
| 6,401,687 B1 | 6/2002 | Kozlov et al. | |
| 6,536,403 B1 | 3/2003 | Elsherbini | |
| 6,776,136 B1 | 8/2004 | Kasempour | |
| 6,883,489 B2 * | 4/2005 | Hochwald | 123/243 |
| 2003/0121494 A1 * | 7/2003 | Yosikane | 123/243 |
| 2005/0072398 A1 | 4/2005 | Feinstein et al. | |
| 2009/0223480 A1 * | 9/2009 | Sleiman et al. | 123/243 |

FOREIGN PATENT DOCUMENTS

| | | |
|---|---|---|
| JP | 2000-220401 | 8/2000 |
| JP | 2001-115849 | 4/2001 |
| KR | 10-1991-0012513 | 7/1991 |
| KR | 10-1995-0011813 | 5/1995 |
| KR | 10-1996-0014611 | 5/1996 |
| KR | 10-2002-0081838 | 10/2002 |
| WO | 01/09485 | 2/2001 |

OTHER PUBLICATIONS

International Search Report and Written Opinion of PCT/US2008/055960; Nov. 26, 2008; 17 pgs.

International Preliminary Report on Patentability of PCT/US2008/055960; Sep. 8, 2009; 9 pages.

* cited by examiner

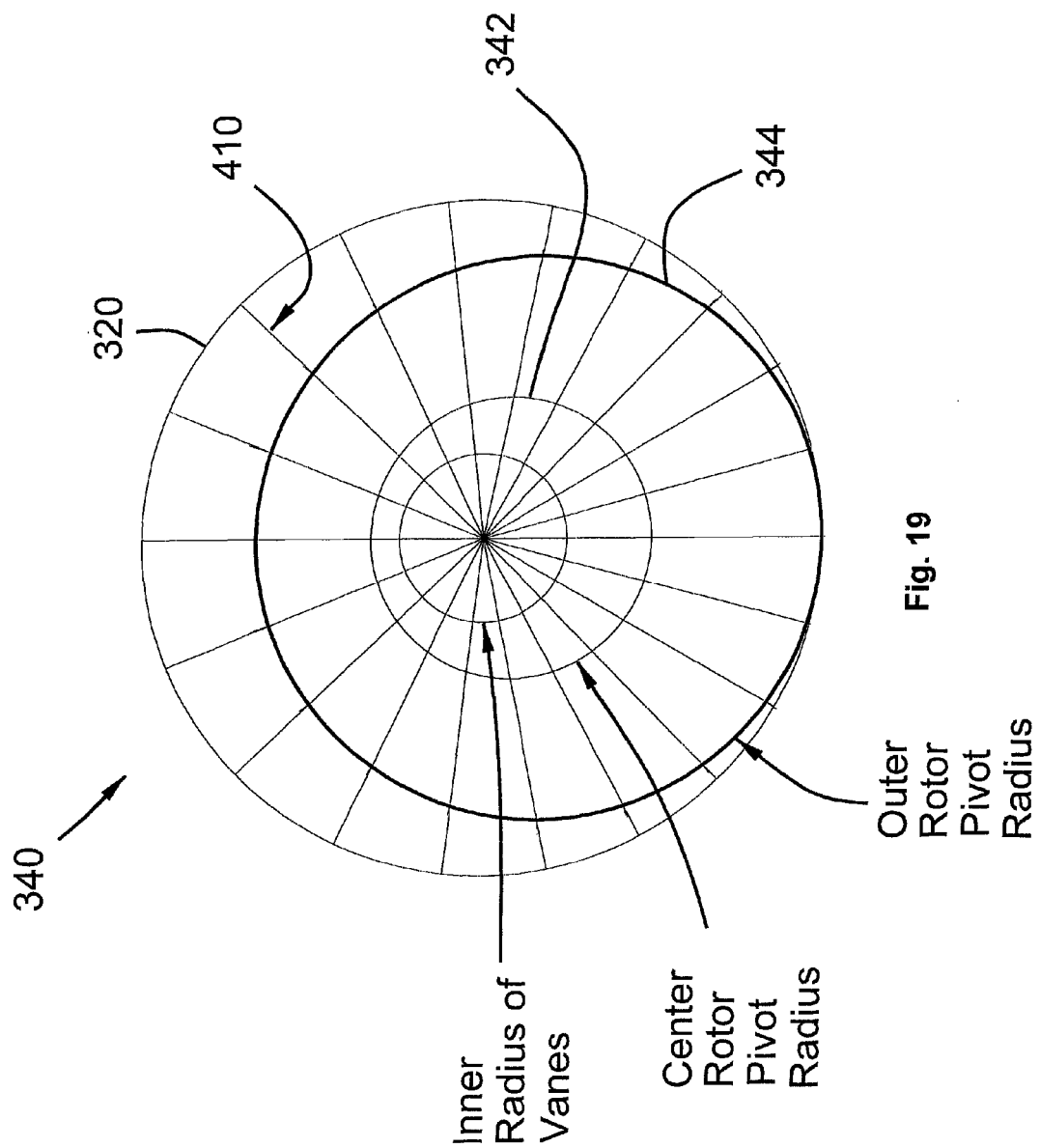

POSITIVE DISPLACEMENT ROTARY VANE ENGINE

CROSS-REFERENCE TO RELATED APPLICATION

This application claims the benefit of U.S. Provisional Patent Application Ser. No. 60/892,913, filed Mar. 5, 2007, the entirety of which is hereby incorporated herein by reference for all purposes.

TECHNICAL FIELD

The present invention relates generally to engines. More particularly, this invention relates to positive displacement rotary vane engines.

BACKGROUND OF THE INVENTION

Premixed and direct-injection spark-ignition piston engines operating on the Otto cycle and direct injection engines operating on the diesel cycle represent the bulk of known engines used for motor vehicles. These engines are popular for a variety of reasons but, primarily, they are widely used because they offer reasonable efficiencies for a wide range of power settings. One major disadvantage for spark-ignition engines is that they must operate in a mode in which the ratio of the fuel mass to the air mass in the engine at the combustion stage is near stoichiometric. Thus, to operate at partial power, the engine must be throttled, whereby the pressure on the intake side must be deliberately reduced in order to limit air mass flow rate. This effectively limits the compression ratio and, in turn, the efficiency of the engines. This fact is the basis for the success of the hybrid-electric propulsion system.

The direct-injection spark-ignition and diesel engines are not as limited by this requirement but these two types of engines have significant emissions problems. The problem of varying the mixture ratio away from stoichiometric is solved using high turn-down ratio combustors in Brayton cycle engines based on gas turbine technology. This is possible because the combustion process occurs in a separate physical area of the engine from the compression and expansion, allowing for only part of the air to be burned in combination with the fuel in a highly controlled way. Having a separate physical area where combustion takes place allows the power levels to be controlled by varying only the fuel flow rate to the combustor. The disadvantage to running the Brayton cycle engines at partial power is explained by the fact that known axial flow compressor and turbine systems are inefficient at off-design operating points.

Another disadvantage of conventional piston engines is that the air is ported to the combustion chamber through valves, which limit the ability of the engine to breathe efficiently and introduce pumping losses even with wide open throttle settings.

To combat these problems, many efforts have been made to develop successful high volumetric flow rate positive displacement compressors of the rotary vane type. Previously known engines of the rotary vane type have substantially depended on intermittent spark-ignition and/or fuel injection in a small volume for combustion. This inherently limits the performance in the same way that piston engine performance is limited by combustion stoichiometry.

Additionally, the sealing of rotary vane devices for high temperature applications such as combustion engines has eluded inventors to date and excessive wear has hampered the success of known rotary vane devices of all types. In order to create a successful rotary vane engine, positive sealing of the vanes must occur along the outer edge of each vane, along the sides of each vane, along the base area of each vane and between the rotor and the case. Without proper sealing, adequate compression and expansion cannot take place. Additionally, the high wear rates associated with the centrifugal forces of known rotary vane engines must be reduced for longevity of the device.

Thus it can be seen that needs exist for improvements to combustion engines and particularly those of the rotary vane type. Additionally, it can be seen that needs exist for rotary vane combustion engines that effectively seal the compression and expansion cavities while reducing component wear, such that an extended service rotary vane engine can be implemented. It is to the provision of these needs and others that the present invention is primarily directed.

SUMMARY OF THE INVENTION

In example forms, the present invention is an engine that employs a positive displacement compression process, a variably fueled, continuous combustor (such as a combustor used in a gas turbine) and/or a heat exchanger, and a positive displacement, work-producing expander. This arrangement avoids the stochiometric mixture requirements with traditional spark-ignition engines based on the entire engine air mass flow rate and the inefficiencies of off-design compressor and turbine performance. Additionally, this arrangement is not compression ratio limited as spark-ignition engines are. Furthermore, the engine of the present invention significantly reduces engine emissions typical with the operation of diesel engines. Example embodiments of this engine as described herein are in the form of a sealable rotary vane device.

In one aspect, the present invention relates to an improvement to a rotary vane internal combustion engine having an external housing and an eccentrically mounted rotor therein. The rotor is operable for rotational movement within the housing to define compression and expansion cavities. The improvement to the engine includes a plurality of blades in mechanical communication with the rotor and extending radially therefrom. The blades are expandable for engagement with at least one interior confronting face of the external housing.

In another aspect, the present invention relates to a rotary vane engine including a cowl that defines an internal chamber and a rotor rotatably mounted with the internal chamber. The rotor includes a plurality of radially configured splines spaced to define slots between successive splines. The engine also includes a plurality of rotary blades and each blade is received in a corresponding one of the slots. The rotary blades are in sliding engagement with the splines. The rotary blades are expandable.

In another aspect, the present invention relates to a rotary vane engine including an external housing defining a hollow chamber therein and a rotor eccentrically mounted within the chamber. The rotor includes a plurality of rotary blades extending radially therefrom. The engine also includes a race that is substantially contained within the rotor. The race is in mechanical engagement with at least a portion of the blades to limit the radial extension of the blades in relation to the rotor.

In still another aspect, the present invention relates to a rotary vane engine including a cowl defining a hollow chamber therein and a rotor eccentrically mounted within the chamber. The rotor includes a plurality of rotary blades extending radially outwardly therefrom for sealing engagement with an interior confronting face of the cowl. At least a portion of the interior face of the cowl defines a substantially exponential curvature.

In yet another aspect, the present invention relates to a continuously combusting rotary vane engine comprising a cowl and a rotor rotatably mounted within the cowl. The rotor includes a plurality of radially mounted blades configured to compress a working fluid from the rotor. The engine also includes a combustor in fluid communication with the cowl to receive compressed working fluid from the rotor. At least a portion of the compressed working fluid is mixed with a fuel source to form a mixture and the mixture is substantially continuously combusted within the combustor.

In another aspect, the present invention relates to a heat powered rotary vane engine including a cowl and a rotor rotatably mounted within the cowl, the rotor having a plurality of radially mounted blades configured to compress a working fluid. The engine also comprises a heat exchanger in fluid communication with the cowl to receive compressed working fluid from the rotor. Energy is transferred from the heat exchanger to at least a portion of the compressed working fluid received therein. Optionally, the heat exchanger is a solar thermal collector.

Is still another aspect, the present invention relates to a rotary vane engine including an external housing defining a hollow chamber therein, a first rotor eccentrically mounted within the chamber, and a second rotor eccentrically mounted within the first rotor. The second rotor includes a plurality of rotary blades extending radially therefrom. The blades extend outwardly through the first rotor to maintain sealing engagement with a confronting interior face of the external housing.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 19 is a plan view of the dual bodied rotor assembly of FIG. 18 shown without the bearings or synchronizing gears.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

In general, the engine of the present invention includes a plurality of vane-type blades that are radially positioned around an offset axis, in such a way as to allow movement in and out of a slotted rotor as the blades are rotated thereabout. The blade tips ride against and are biased towards a variable radius outer housing or cowl, wherein variable volume gas cavities are formed between the blades and the outer housing. The rotation of the blades provides for compression and expansion of air by their circular movement against the variable radius outer surface. The compression ratio of the various example embodiments as described below is determined primarily by the distance between successive blades and by the precise positioning of the intake port and the combustor ports. The example embodiments shown and described below represent a substantially constant volume combustion device and have been found to exhibit a compression ratio of approximately 15:1; however, the invention also includes embodiments exhibiting higher or lower compression ratios.

Figure 1:
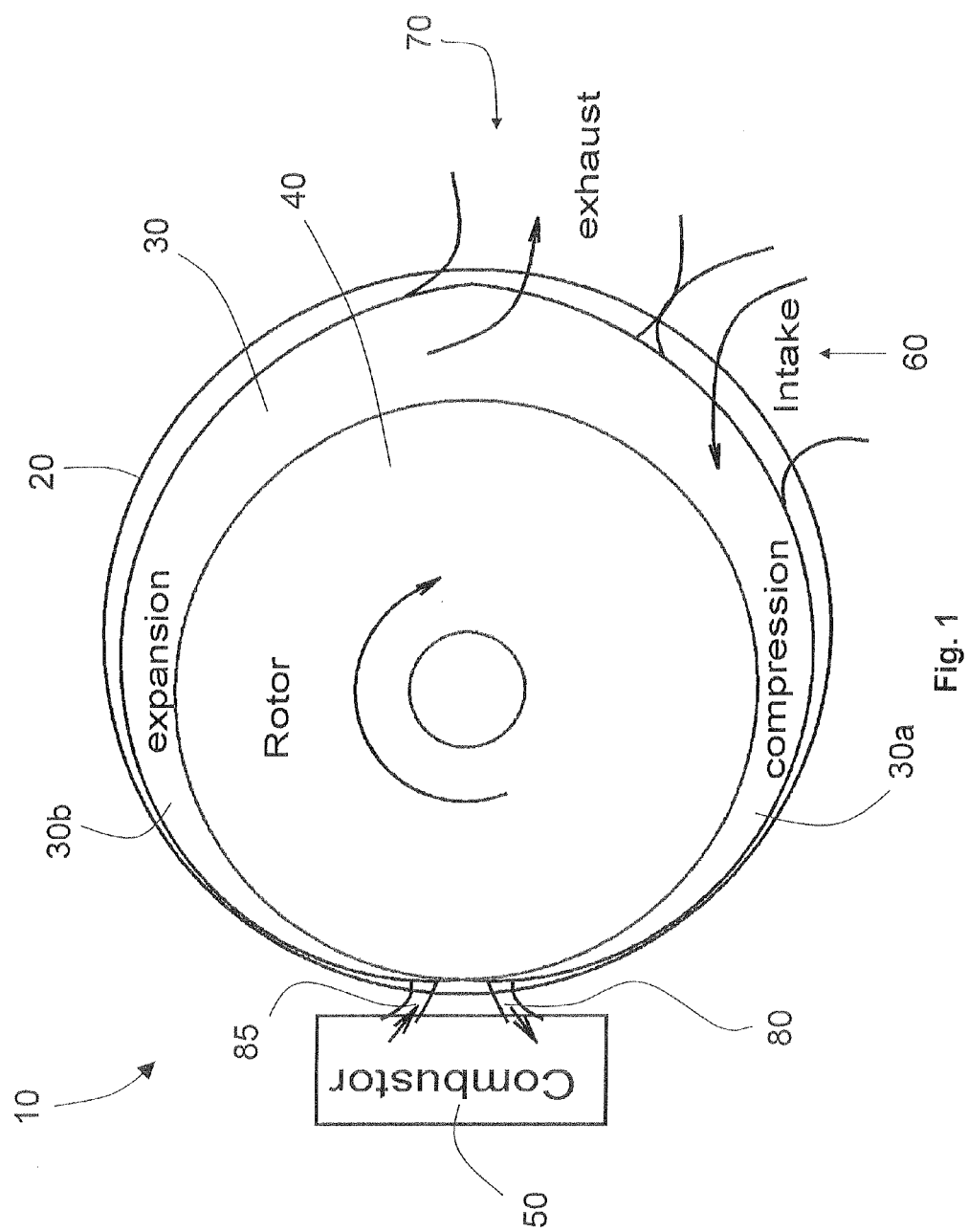
FIG. 1 schematically shows an example embodiment of a rotary vane engine cycle according to the present invention.

With specific reference now to the drawing figures, the operational engine cycle of an engine 10 according to an example embodiment of the present invention is shown in FIG. 1. Generally, the engine 10 of the present invention includes an outer housing or cowl 20, an expansion/compression cavity 30, an internal rotor 40, and an external combustor 50. In example embodiments, rotation of the rotor 40 compresses fresh air, or alternate working fluid, brought in through an intake port 60 and into the compression side of the expansion/compression cavity 30a and deposits the same into the combustor 50. Compressed air is deposited into the combustor 50 through a compression port 80. Upon entering the combustor 50, fuel is introduced into a portion of the air stream at high pressure. The resulting fuel/air (fuel/working fluid) mixture is ignited in the combustor 50 and the ensuing combustion that takes place rapidly heats the air before it is reintroduced into the expansion side of the compression/expansion cavity 30b for expansion, before ultimately being rejected to the external environment through an exhaust port 70. The heated air is reintroduced into the expansion cavity 30b via an expansion port 85. The rapid expansion of the air after combustion induces rotation of the rotor 40 to complete the engine cycle of the present invention. As shown in the drawing figures, example embodiments of the engine 10 comprise a single rotor 40 that is used for both compression and expansion. Alternatively, the engine 10 can utilize two or more rotors 40. Depending on the particular locations that the air is ported into and out of the combustor 50 from the compression/expansion cavity 30, example embodiments of the engine 10 can be operated on various engine cycles such as: a constant volume combustion process such as the Otto Cycle and/or the Atkinson Cycle, a constant pressure combustion process such as the Brayton Cycle, or the engine can be operated on a cycle in-between the two as the Diesel cycle is often modeled.

In example embodiments of the present invention the combustor 50 of the engine 10 only allows for a fraction of the air to be burned while maintaining combustible mixtures necessary for continuous combustion. In this embodiment, the combustor 50, as shown schematically in FIG. 2, includes a ducting system 52 and overall shape, such as an oval, circle, ellipse etc. (but not limited to such), to allow for continuously recirculating air, fuel and combustion products. This design permits a variable level of fuel injection through a ported cylindrical device. The primary consideration for the recirculating design is to ensure continuous combustion of the fuel at high turn-down ratios with minimum emissions. For example, as compressed air is brought into the combustor 50, the ducting system 52 routes a portion of the air away from a fuel injecting source 54 through a duct 53, such that the intake air is segregated. By segregating the air, not all of the intake air is immediately combusted (and not all of the air will necessarily be combusted) and is circulated through the combustor 50. In example embodiments, fuel is introduced into the combustor 50 through a high-pressure fuel injector 54, which directly injects fuel into at least a portion of the intake air stream from the compression port 80. An igniter 56, such as for example a spark or glow plug, is located in proximity to the fuel injector 54 to ignite the fuel/air mixture. In preferred example embodiments, the igniter 56 is only needed during start-up to initially combust the fuel/air mix, as continual combustion takes place within the combustor 50. Delivery of compressed air into the combustor 50 via the compression port 80 (and expanding gases being delivered back into the expansion/compression cavity 30) further enables continuous combustion in preferred example embodiments, as compression and expansion is permitted to continuously occur within the compression/expansion cavity 30 rather than intermittent compression, ignition, and expansion typical with known engines. Because air is introduced into the combustor 50 at constant volume and pressure, a user need only reduce the amount of fuel injected into the combustor 50 to reduce overall engine output. Most known engines operating on the Otto cycle require a user to reduce (throttle) both the air and fuel that is delivered to the combustion chamber in order to reduce engine output, which reduces both the compression ratio and efficiency of the engine. Additionally, the continuous combustion that occurs within the combustor 50 significantly reduces harmful emissions produced by the engine 10, when compared to the emissions produced by known spark-ignition and direct injection engines. Specifically, the combustor 50 has a larger relative volume and higher resonance times than known spark-ignition and direct injection engines. Furthermore, the recirculation of combustion products within the combustor 50 minimizes CO, NO, and soot emissions. In alternate example embodiments, the igniter 56 ignites the fuel/air mix intermittently, such that semi-continuous or intermittent combustion occurs within the combustor 50.

Figure 2:
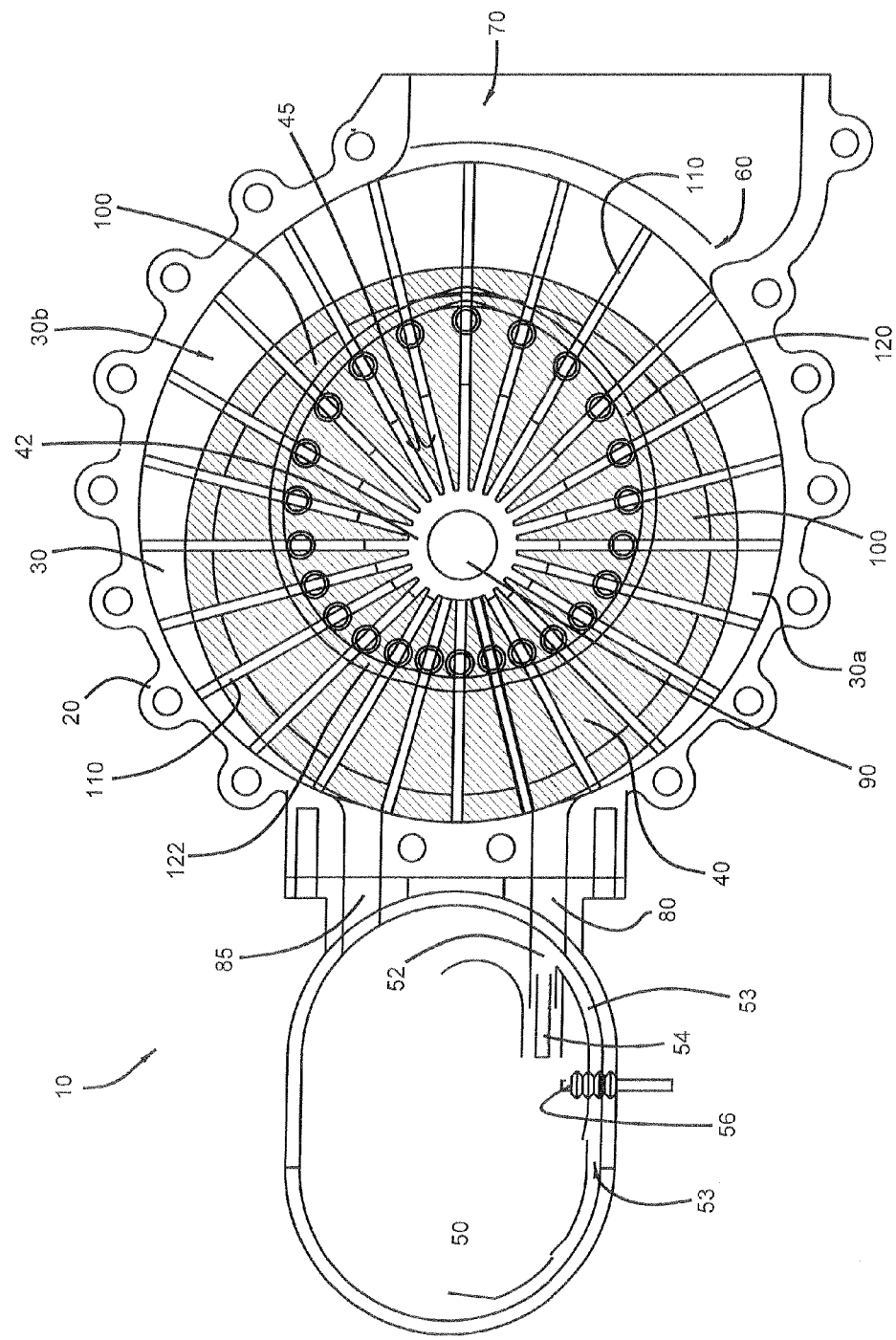
FIG. 2 is cross sectional plan view of a rotary vane engine according to an example embodiment of the present invention.
Figure 3:
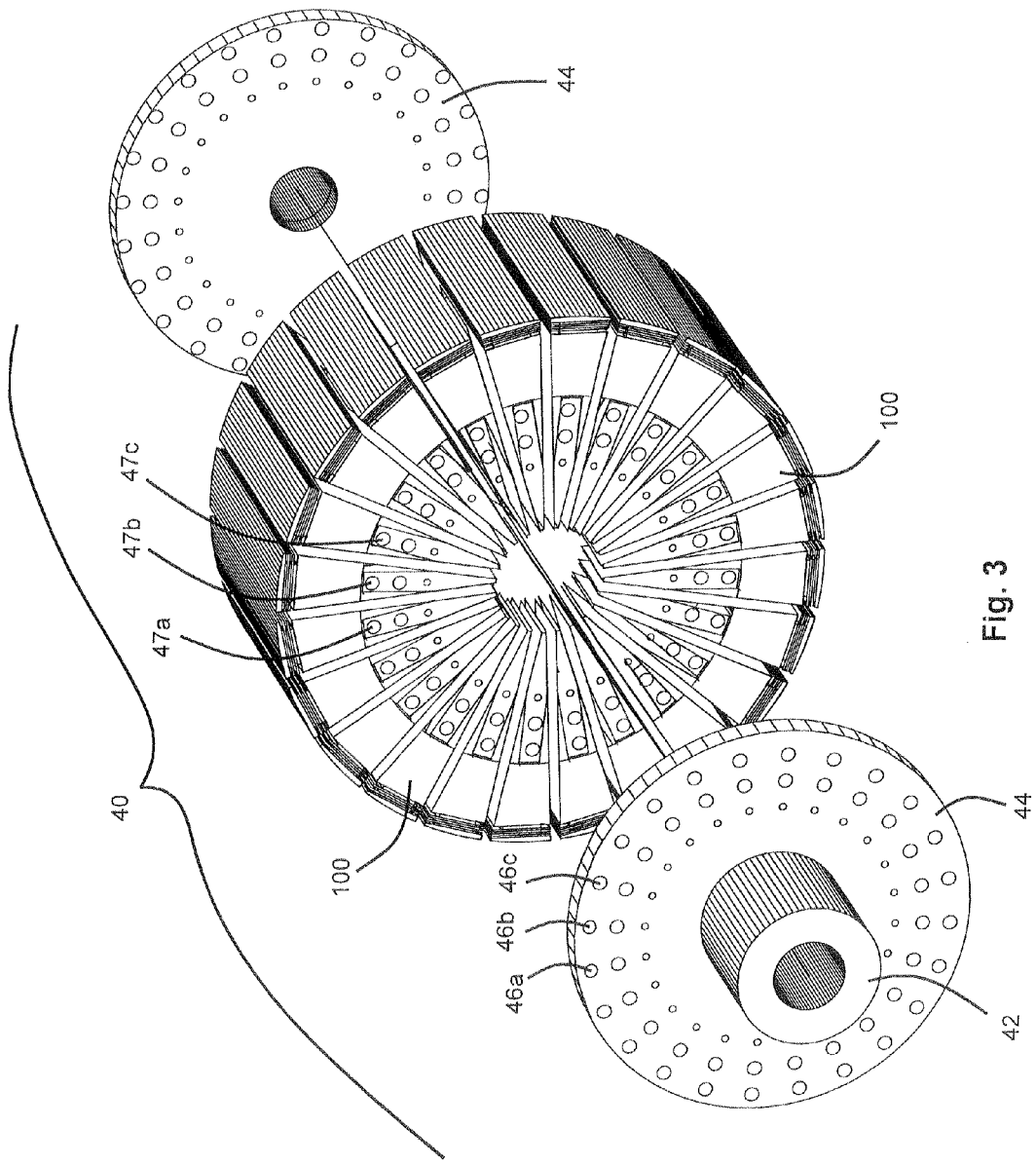
FIG. 3 is an exploded perspective view of a rotor used in conjunction with the engine of FIG. 2.
Figure 4:
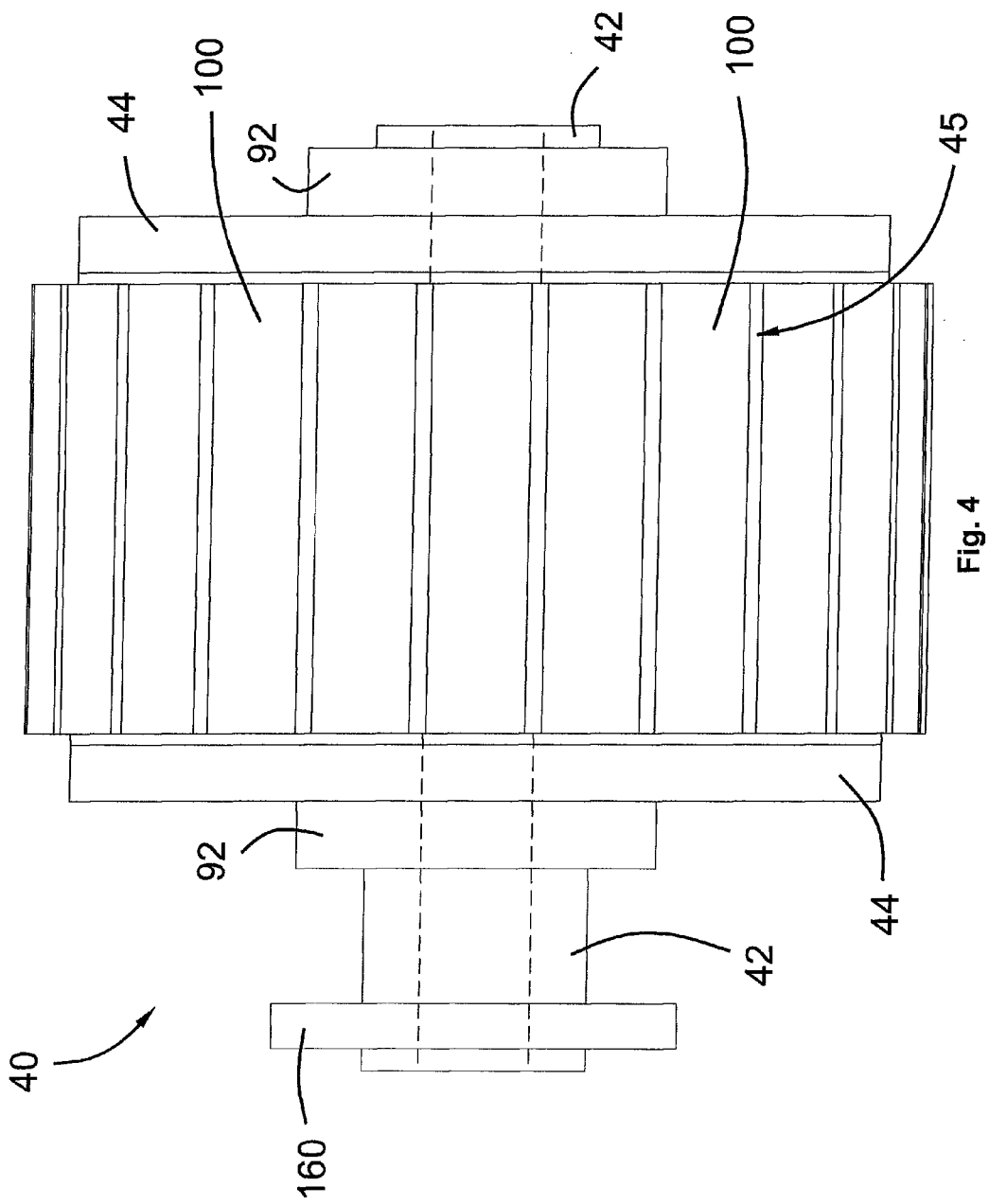
FIG. 4 is a side view of the rotor of FIG. 3, shown mounted with an output gear.
Figure 5:
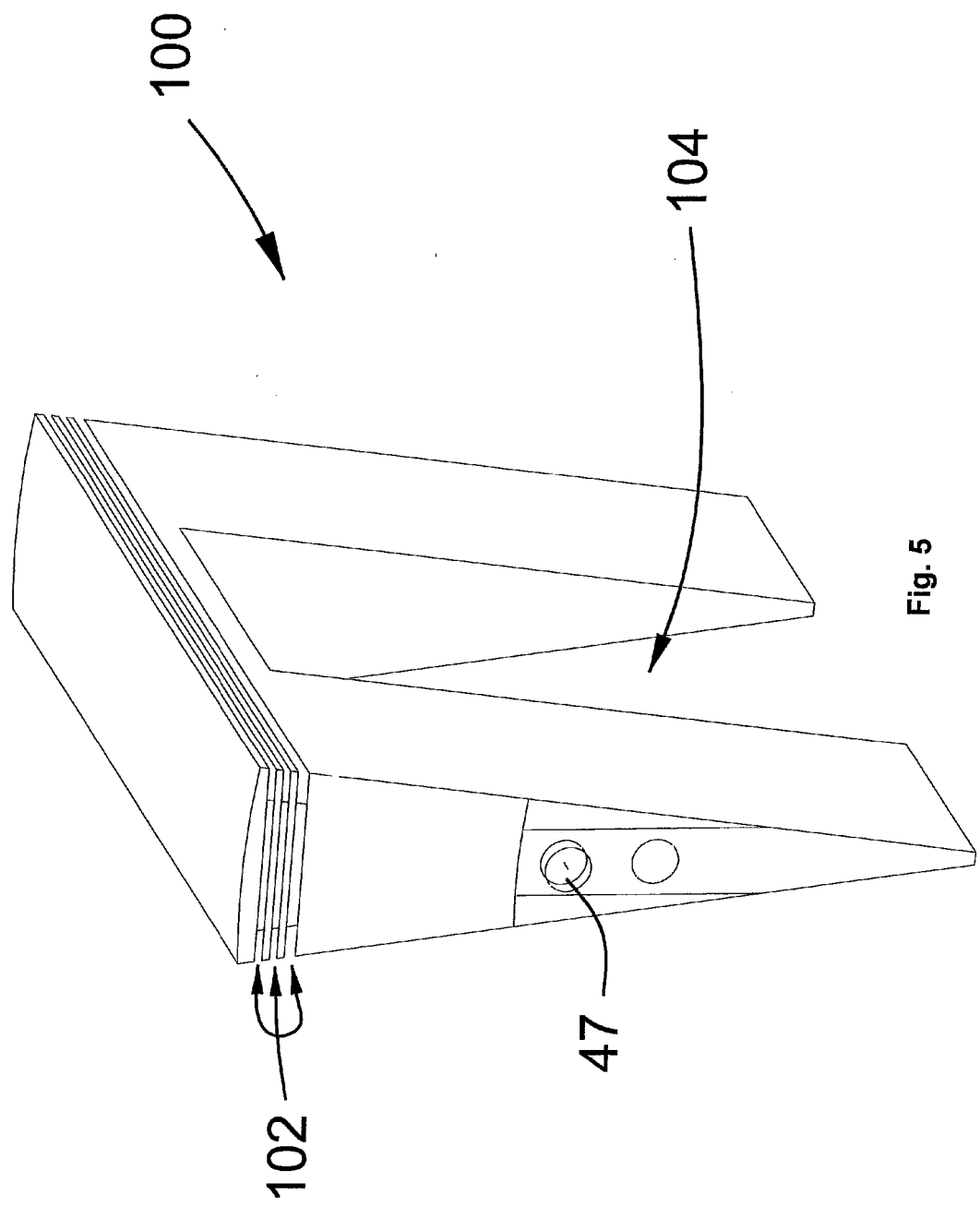
FIG. 5 is a perspective view of a rotor spline used with the rotor of FIG. 3.

A more detailed image of an example embodiment of the engine 10 is depicted in FIG. 2. As seen therein, the rotor 40 and the cowl 20 are axially offset, such that the volume of the compression/expansion cavity 30 is variable throughout the compression/expansion cycle. The rotor 40 is further comprised of a plurality of individual pie-shaped wedges or splines 100 and a pair of rotor side plates 44 that are mated to each side of the splines 100 to keep the splines in proper alignment as depicted in FIGS. 2-4. The rotor side plates 44 are coaxially aligned with the splines 100 and each spline can be mated thereto with bolts and/or nuts, or other mechanical fasteners or attachment means. In example embodiments, the rotor side plates 44 include a plurality of bolt holes 46 that correspond to a plurality of bolt holes 47 in each spline for receiving a bolt therethrough, such that the two can be rigidly secured together. For example, bolt holes 46a, 46b, 46c in the rotor side plates 44 correspond to bolt holes 47a, 47b, 47c in the splines 100, as shown in FIG. 3. The bolt holes 46, 47 can be tapped to receive threaded bolts/screws or can be bored as desired. Alternatively, the rotor side plates 44 can be welded in whole, or in combination with other fasteners, to the splines 100. Each spline 100 further includes at least one, and preferably a series of, concentric grooves 102 positioned near the radial end of the spline, as shown in FIG. 5. The concentric grooves 102 are adapted to receive compression seals or rings to prevent blow-by from reaching the interior of the rotor 40 and seal the rotor against the cowl 20. As such, the rotor 40 is fully sealable.

Referring again to FIG. 2, the rotor 40 further includes a rotating hub 42, which rotates about a fixed shaft 90. In example embodiments, the hub 42 is disengaged from the fixed shaft 90, such that a gap exists between same. In such embodiments, bearings 92 (FIGS. 4 and 16) can be included between the hub 42 and the cowl 20 to keep the rotor 40 in proper alignment within the cowl. In alternate embodiments, the hub 42 comprises a hollow sleeve that is rotatably coupled to the shaft 90, and can include one or more bearings (not shown), such as ball, sleeve, or other bearings, to reduce friction between the hub and shaft. Alternatively, lubricant such as oil and/or grease, can be applied between the hub 42 and fixed shaft 90 to reduce mechanical wear and friction between the same.

Figure 6:
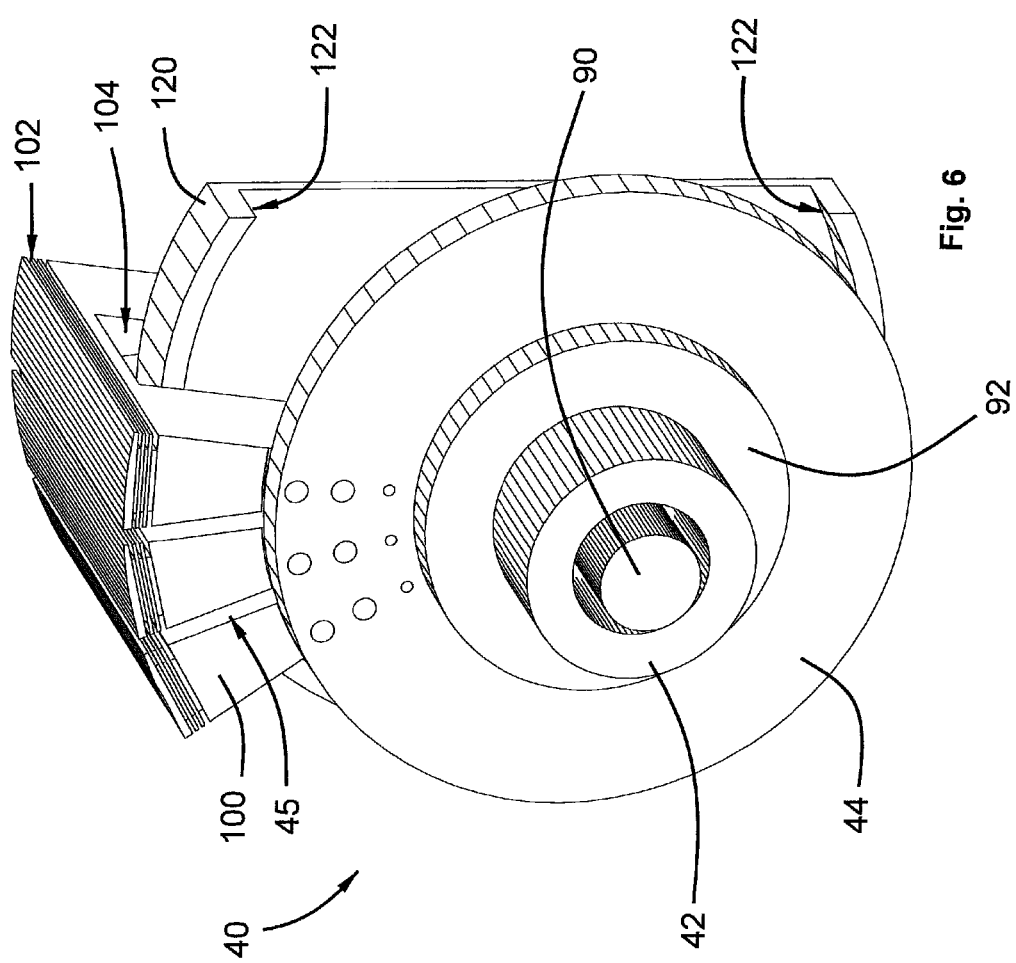
FIG. 6 is a perspective partial cut-away view of the rotor of FIG. 3, an example blade race, and a fixed shaft according to an example embodiment of the present invention.

The rotor 40 is adapted to slidably receive a plurality of expandable vanes or blades 110 between the plurality of splines 100 as shown in FIG. 2. The blades 110 are received in gaps or slots 45 located between successive splines 100 and are free to slide within the slots, such that the radial extension of the blades from the splines is variable. Generally, the blades 110 extend outwardly from the splines 100 to maintain sealing contact with the confronting inner face of the cowl 20. In example embodiments, the number of blades 110 corresponds to the number of splines 100, such that the rotor 40 includes an equal number of blades and splines. Alternative embodiments of the engine 10 can include more blades 110 than splines 100, or vice versa, as desired by a user. It has been found that the compression ratio of the engine 10 increases as the number of splines 100 and blades 110 increases. At relatively high rotating speeds, the blades 110 in example embodiments of the rotary vane device shown in the drawing figures can be pressed against the outer housing 20 by centrifugal forces much larger than the force that is needed for creating a seal between the two. In fact, such forces are responsible for the relative inefficiencies of known rotary vane engines, as the forces cause rapid wearing of the rotary vanes. Therefore, the rotor 40 of the present invention also houses an internal blade guide or race 120, to guide the sliding movement of the blades 110 within the blade slots 45. In general, the race 120 limits the radial distance each blade 110 extends from the rotor 40, which will be explained in detail below. As shown in FIG. 5, each spline 100 includes a cutout 104 for receiving the race 120 therethrough, such that the race is contained within the splines. However, in preferred embodiments the race 120 is not in direct engagement with the splines 100, as better seen in FIG. 6, which demonstrates the relative relationship between the rotor side plates 44, splines, and race.

Figure 7:
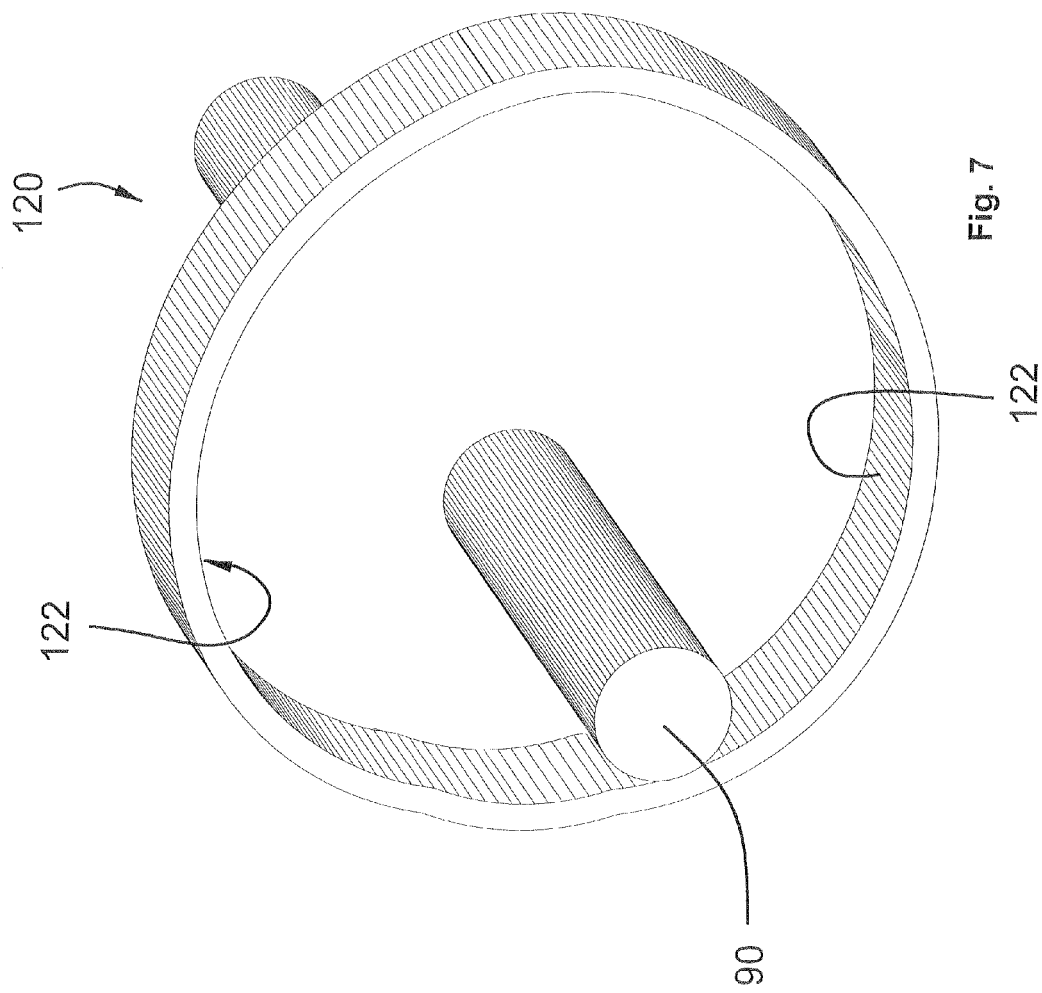
FIG. 7 is a perspective view of the blade race and fixed shaft of FIG. 6.
Figure 8:
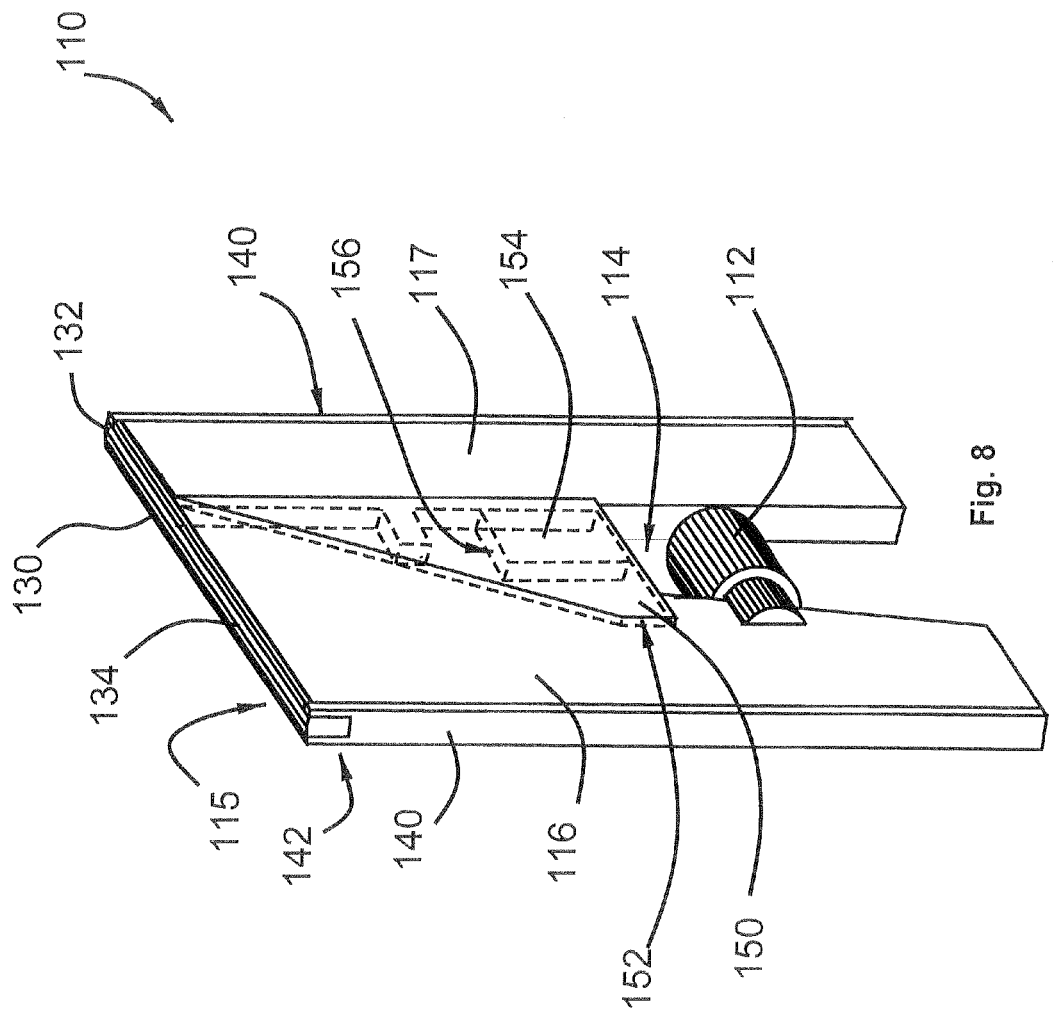
FIG. 8 is a perspective view an example embodiment of a rotary blade used in conjunction with the engine of FIG. 2.
Figure 9:
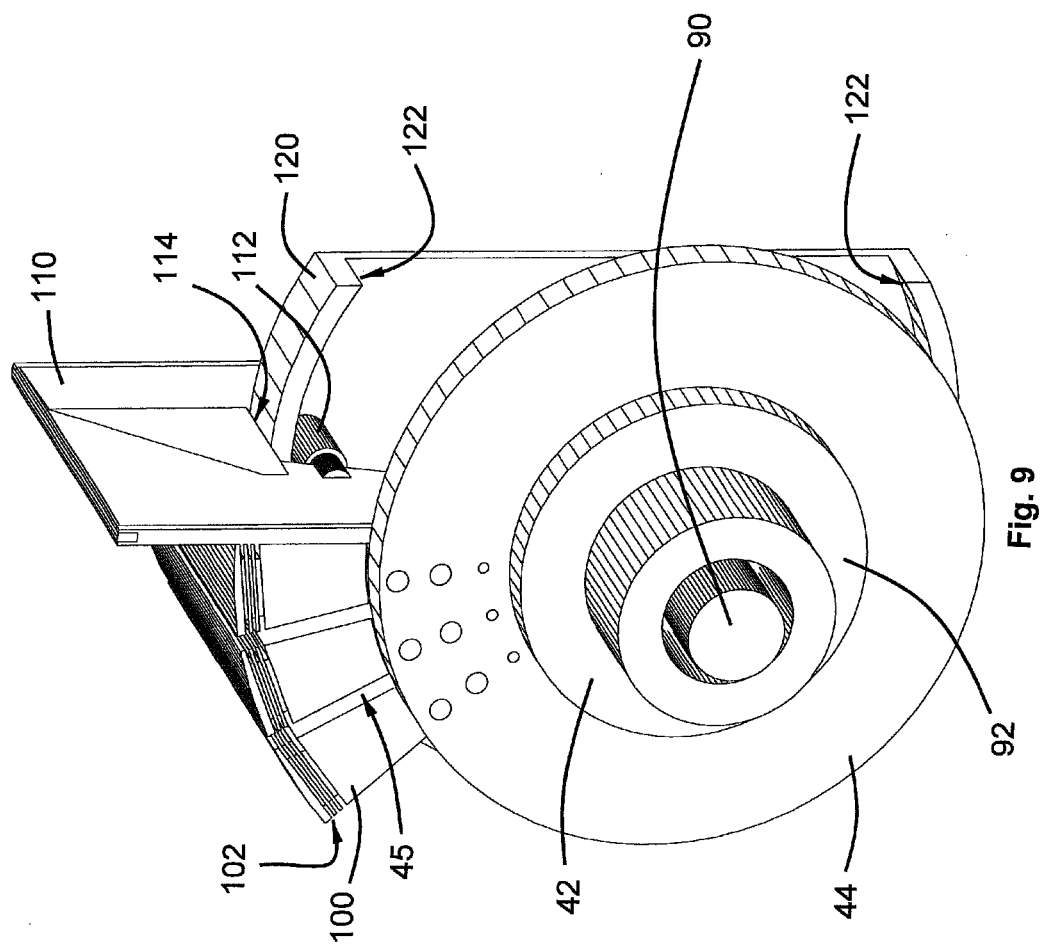
FIG. 9 is a perspective partial cut-away view of the rotor, blade race, and fixed shaft of FIG. 6, shown mounted with the blade of FIG. 8.

Rather than engaging the splines, the race 120 is fixedly positioned within the cowl 20 and is anchored to the fixed shaft 90; the relationship between the race and shaft can be seen in FIG. 7. The fixed race 120 can be rigidly coupled to the shaft 90 with splines, keys, cotters, or other conventional fasteners, or the race can be permanently mated to the shaft through welding. Alternatively, the race 120 and the shaft 90 can be cast as one piece. In example embodiments, the shaft 90 is rigidly coupled to the housing or cowl 20, to ensure that the shaft and race 120 are fixedly positioned within the same. As shown in both FIGS. 6-7, the race 120 includes a lip or blade guide surface 122 for contacting a portion of the blade 110 thereon. Each blade 110 includes a blade collar 112, as can be seen in FIG. 8, for rotatable and/or slidable engagement along the blade guide surface 122. Additionally, each blade 110 includes a narrow cutout 114 that extends above the blade collar 112 and around the collar's distal edge for receiving the race 120 and the blade guide surface 122 therethrough. FIG. 9 depicts a blade 110 in engagement with the blade guide surface 122 of the race 120. It can be seen that the blade collar 112 is pressed against the inside edge of the blade guide surface 122 (and is firmly held there by centrifugal motion when in operation) and that the race and guide surface fit into and through the cutout 114. Referring back to FIG. 2, it can be seen that as the rotor 40 and blades 110 rotate within the cowl 20, the blade collar 112 maintains contact with the blade guide surface 122, such that the radial extension of the blades from the splines 100 varies as the blades circumnavigate the race 120. For example, the blades 110 reach maximum radial extension (fully extended position) from the splines 100 just as each blade passes the exhaust port opening 70, and are minimally extended (or are flush with the rotor) as the blades pass the compression port 80 (retracted position).

Figure 10:
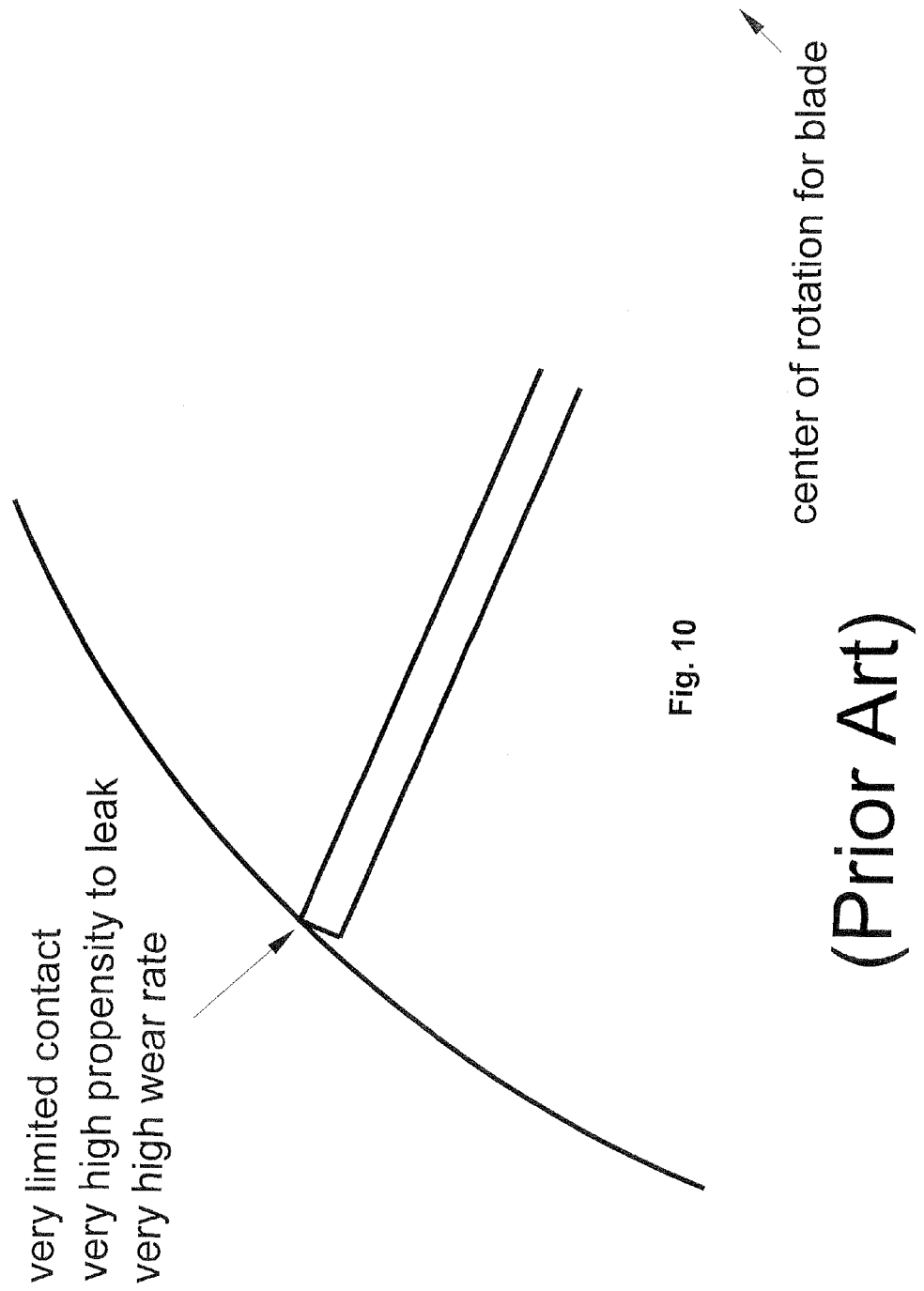
FIG. 10 shows a prior art sealing configuration between an engine housing and rotary blade.
Figure 11:
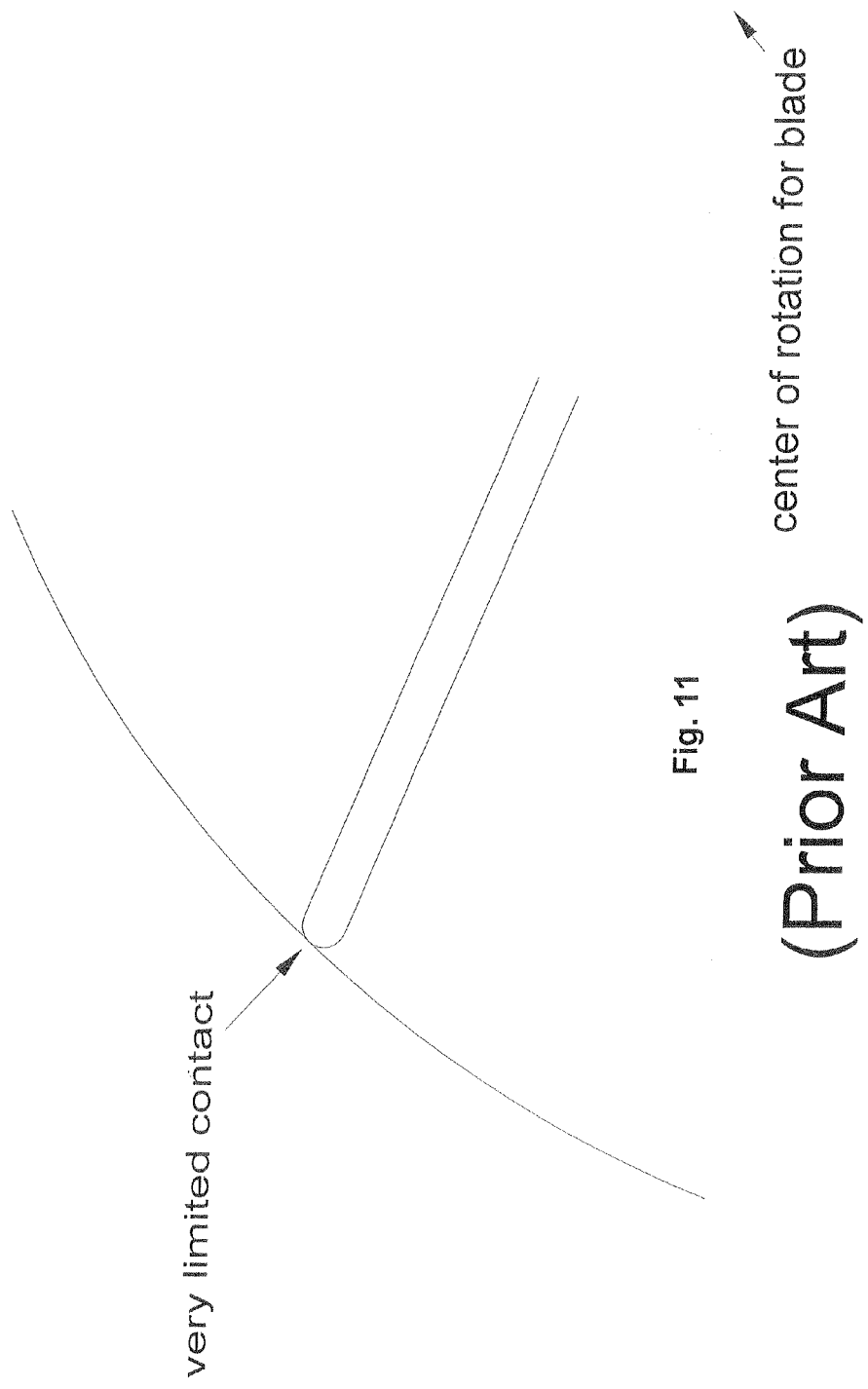
FIG. 11 shows another prior art sealing configuration between an engine housing and rotary blade.
Figure 12:
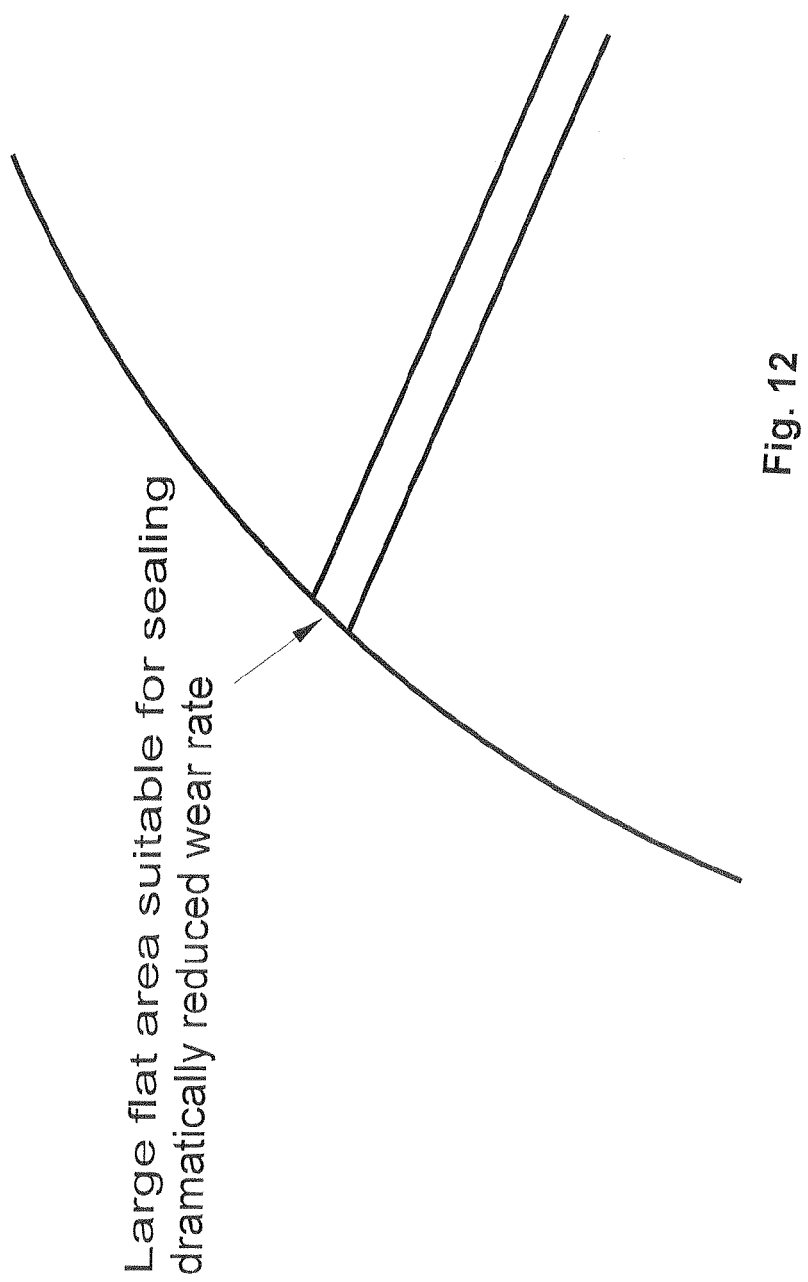
FIG. 12 shows an example configuration according to the present invention of an optimal arrangement for sealing a blade against an engine housing.

In preferred embodiments of the present invention, the curvature of the cowl 20 is in the shape of an exponential curve, as seen in FIG. 2. While other embodiments can utilize various elliptically or otherwise shaped cowl designs, it has been found that engine performance is optimized when the cowl 20 is shaped as an exponential curve. Additionally, it has been found that engine performance is optimized when the shape of the race 120 is substantially geometrically similar (same shape or similar shape, but different scale) to the curvature of the cowl 20, or vice versa, as shown in FIG. 2. Specifically, sealing between the blades 110 and the cowl 20 can be maintained over extended service cycles when the blades are forced to follow a race 120 having an exponential curve coupled with a substantially geometrically similar, or approximately similar, curve for the cowl. Known rotary vane type engines are inefficient and often fail after few service cycles due to the lack of an effective sealing surface between the blades and housing. For example, most known rotary vane engines depend upon blade tip sealing arrangements as shown in FIGS. 10-11. FIG. 10 depicts a square tipped blade riding against a curved surface. This arrangement has been unsuccessful because an effective seal cannot be created between the blade and the housing due to the minimal contact area between the same. Additionally, the minimal contact area results in a high rate of wear that quickly reduces the efficiency of an engine employing this arrangement. FIG. 11 depicts an improved arrangement (over the arrangement depicted in FIG. 10), wherein the blade tip is rounded to reduce the amount of wear. However, because the contact area between the blade tip and housing is still relatively small, blow-by and compression losses result in significant engine inefficiencies. Instead, it has been found that seals between the rotary blades and the housing offer better sealing qualities and improved lubrication characteristics when intimate contact is effected between two nearly flat surfaces, as opposed to those known seals between a substantially curved surface and a nearly flat surface. Additionally, it has been found that a blade tip having a relatively large flat contact area that is angled to match the surface contour of the cowl provides for maximum sealing (and engine) efficiency, as depicted in FIG. 12.

Figure 13:
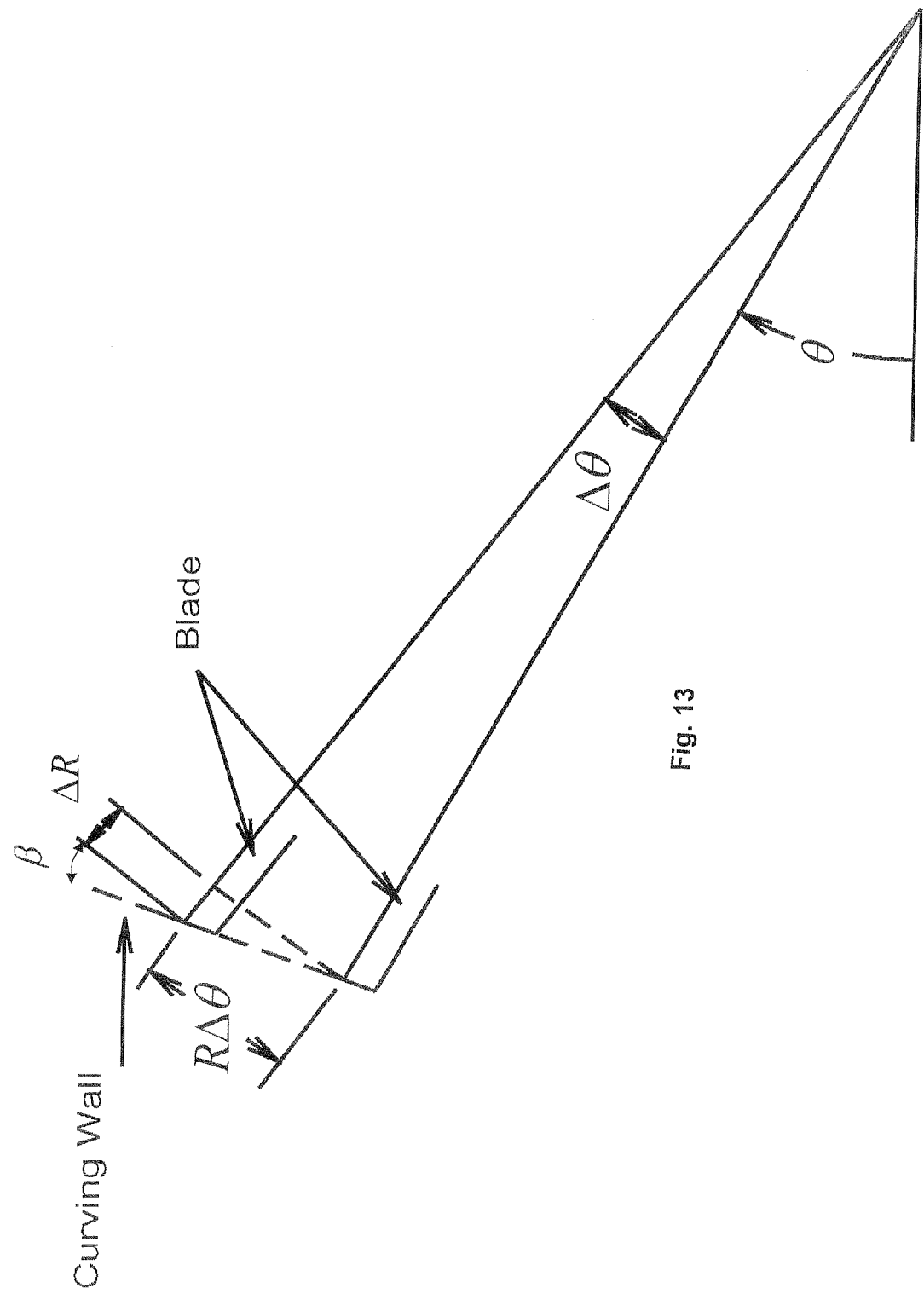
FIG. 13 is a mathematical depiction used to configure the optimal arrangement between the blade and engine housing.

The optimal shape for the curvature of the cowl 20 and race 120 can be mathematically determined with the following analysis and reference to FIG. 13. The distance from the origin of the rotating motion of the blade to the curving cowl wall is "R" and the angle between a flat blade tip and an otherwise perpendicular blade tip surface is "β". As the blade moves through a differential angle Δθ, the change in the radial distance between the origin of blade motion and the surface of the cowl, ΔR will be:

$$\Delta R = R(\Delta\theta)(\tan\beta)$$

For differential changes in the angle θ, this equation can be rewritten as:

$$dR = (\tan\beta)R(d\theta)$$

For intimate contact between the blade tip and the cowl surface to be maintained, the angle β will be constant not only for the fixed geometry blade but also for the surface upon which it slides. Taking β to be constant and separating the variables yields:

$$\frac{dR}{R} = (\tan\beta)d\theta$$

Integrating this equation from a reference starting value of $R_o$ at θ=0 gives:

or $$\ln R \big|_{R_o}^{R} = (\tan\beta)\theta$$

$$R = R_o e^{(\tan\beta)\theta}$$

Hence the most ideal shape for sealing between the blade tip and cowl with a fixed geometry blade is exponential. To demonstrate the optimal curve shape in another way, the sealing of the blade tips against the cowl can be optimized by recognizing that a short line segment at a practically perpendicular radial line can slide in nearly intimate contact with a cowl containing the rotating vanes if the shape of the cowl is an exponential curve described by the equation:

$$r = r_0 e^{k\theta}$$

where "r" is the radius of the curve at a given angle θ from a reference line, "$r_o$" is the reference radius (approximately the radius of the rotor), and "k" is a small constant determined based on desired engine flow rates and mechanical considerations. In addition, the relationship between the curvature of the race 120 and the curvature of the cowl 20 can be represented as:

$$r_{cowl} = r_{race} + d$$

wherein the radius of the cowl at any given point is equal to the radius of a corresponding point on the race plus some constant "d" representing the radial distance between the corresponding points. Therefore, it is preferred, but not required, that race 120 and cowl 20 follow corresponding exponential curves to optimize blade sealing capacity and engine performance.

Figure 14:
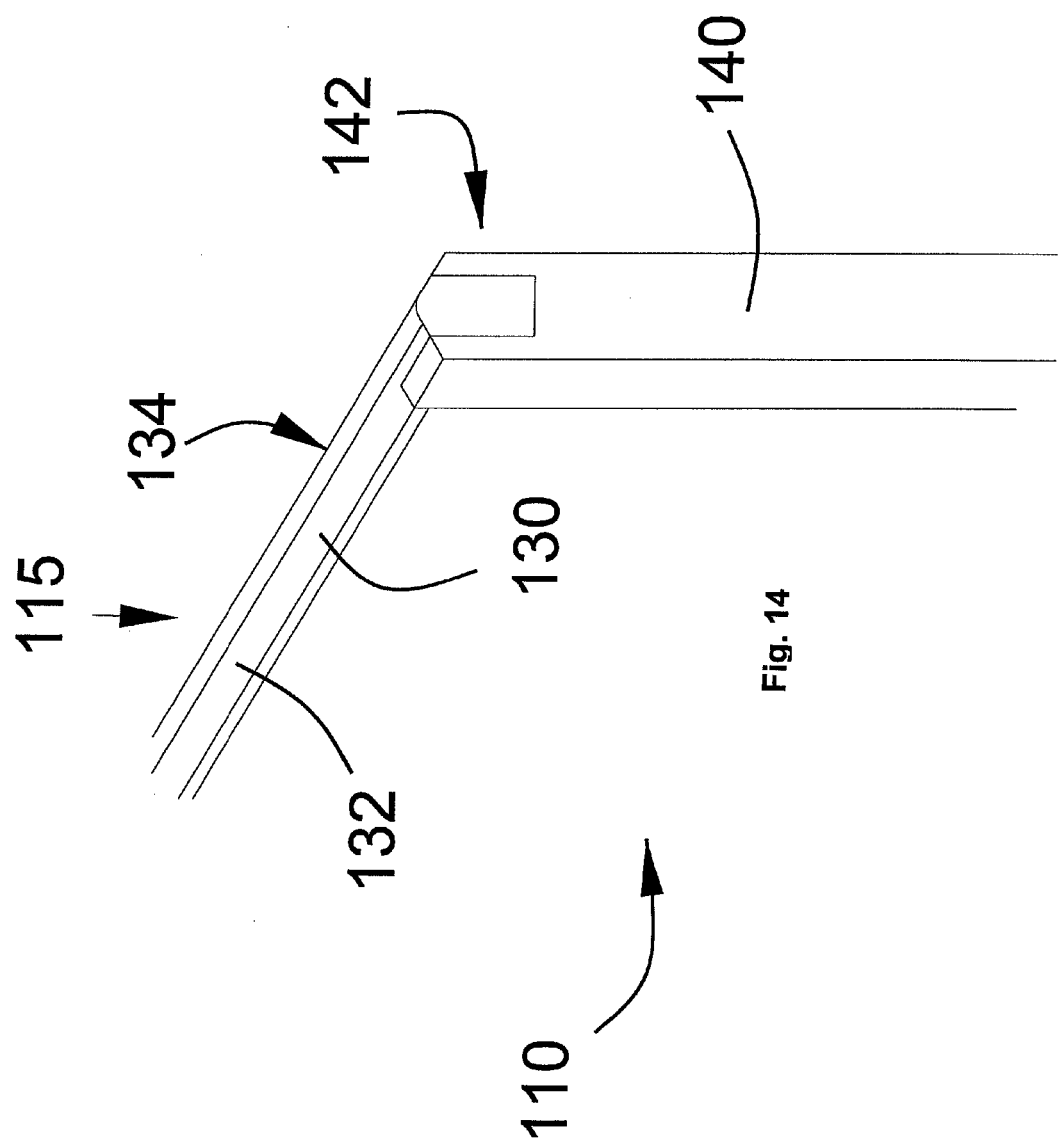
FIG. 14 is a blown-up perspective view of the blade sealing surfaces of the blade of FIG. 8.

In order for the blades 110 to optimally seal against the curvature of the cowl 20 as the blades rotate through both the compression and expansion cycles, the tip of each blade 115 is fitted with a blade tip seal 130, as better seen in FIG. 14. In example embodiments, each blade tip seal 130 is comprised of a dual headed tip having two flat surfaces 132, 134 for intimate engagement with the cowl 20. As each blade rotates from the exhaust port 70 towards the compression port 80, the flat surface 132 is in engagement with the cowl 20, and when the blade moves from compression back into expansion, the opposite flat surface 134 engages the cowl. In this manner, a flat surface of the blade tip seal 130 is in constant engagement with the cowl 20 at all times during expansion and compression. Alternatively, the blade tip seal 130 can be rounded or include a single flat surface. In still other embodiments, the blade tip seal 130 can comprise more than two flat surfaces as desired.

Returning to FIG. 8, in example embodiments, the sides of each blade 110 are fitted with first and second side seals 140 to seal each blade against the sides of the cowl 20 to prevent blow-by and/or compression loss. Generally, the side seals 140 are as thick as the blades 110, as depicted in the drawing figures, but in alternate embodiments the side seals are a fraction of the blade thickness. The side seals 140 can be rigidly coupled to the blade tip seal 130 through any number of conventional joints, such as a bridle joint, dovetail joint, lap joint, T-joint, mortise and tendon joint, and/or any other conventional method of joining the same. In preferred example embodiments, a bridle joint 142 is used to couple the side seals 140 to the blade tip seal 130. In other embodiments, the side seals 140 and blade seal 130 can be formed as a unitary part, separately or in conjunction with the blade 110.

During operation, the internal components of the engine 10 expand due to the heat from internal combustion, including the cowl, the expansion/compression cavity 30 and the blades 110. Unfortunately, once tight tolerances between these components at startup grow significantly as the components are exposed to high heat. Known rotary vane engines have been unsuccessful in resolving these changes in tolerances, which typically result in increased engine wear and large inefficiencies due to compression losses. The present invention solves this problem by engineering the blades to expand to maintain sealing across a range of thermal expansion and contraction. One such embodiment of an expandable blade is seen in FIG. 8, wherein the expandable blade 110 is comprised of three main components: two blade halves 116, 117 and at least one expansion wedge 150 therebetween. Alternatively, the blade 110 can be divided into thirds or fourths or fifths, etc. and two or more expansion wedges can be used as desired. In depicted example embodiments, the two halves 116, 117 are interlocked together through the use of at least one tongue and groove joint 118. In alternate embodiments, the two halves can be coupled with additional joints to interlock the same and/or other types of conventional fasteners, such as clips, hooks, etc., or conventional joints can be utilized. In example embodiments, the expansion wedge 150 is positioned within a recess 152 into the face of the two blade halves 116, 117, such that the expansion wedge is flush with the top surface of the blade halves, as shown in the drawing figures. The wedge 150 also includes a protrusion 154 that is received by a complementary recess 156 in the blade 110 to further provide a frictional force to retain the wedge therein. In example embodiments, the wedge 150 is triangular, wherein the narrowest angle of the triangle is directed towards the blade tip 115 and the wider end of the triangle is directed towards the root of the blade. In preferred embodiments, two or more wedges 150 can be used per blade 110. In still other embodiments, the blade body 110 can be comprised of a unitary unit. However, regardless of the particular embodiment used, as the engine components are exposed to heat from the internal combustion, the cowl 20 begins to expand. This expansion causes gaps to occur between the blade tip seal 130, side seals 140, and the expanding cowl, such that efficiency losses would occur without the expansion capabilities of the blade 110. The centrifugal forces that the blade 110 is subjected to in normal operation, biases the expansion wedge 150 radially outwards (towards the cowl 20), such that the triangular wedge drives the two halves 116, 117 incrementally apart and permits the blade 110 to expand widthwise and maintain a seal against the cowl 20.

Figure 15:
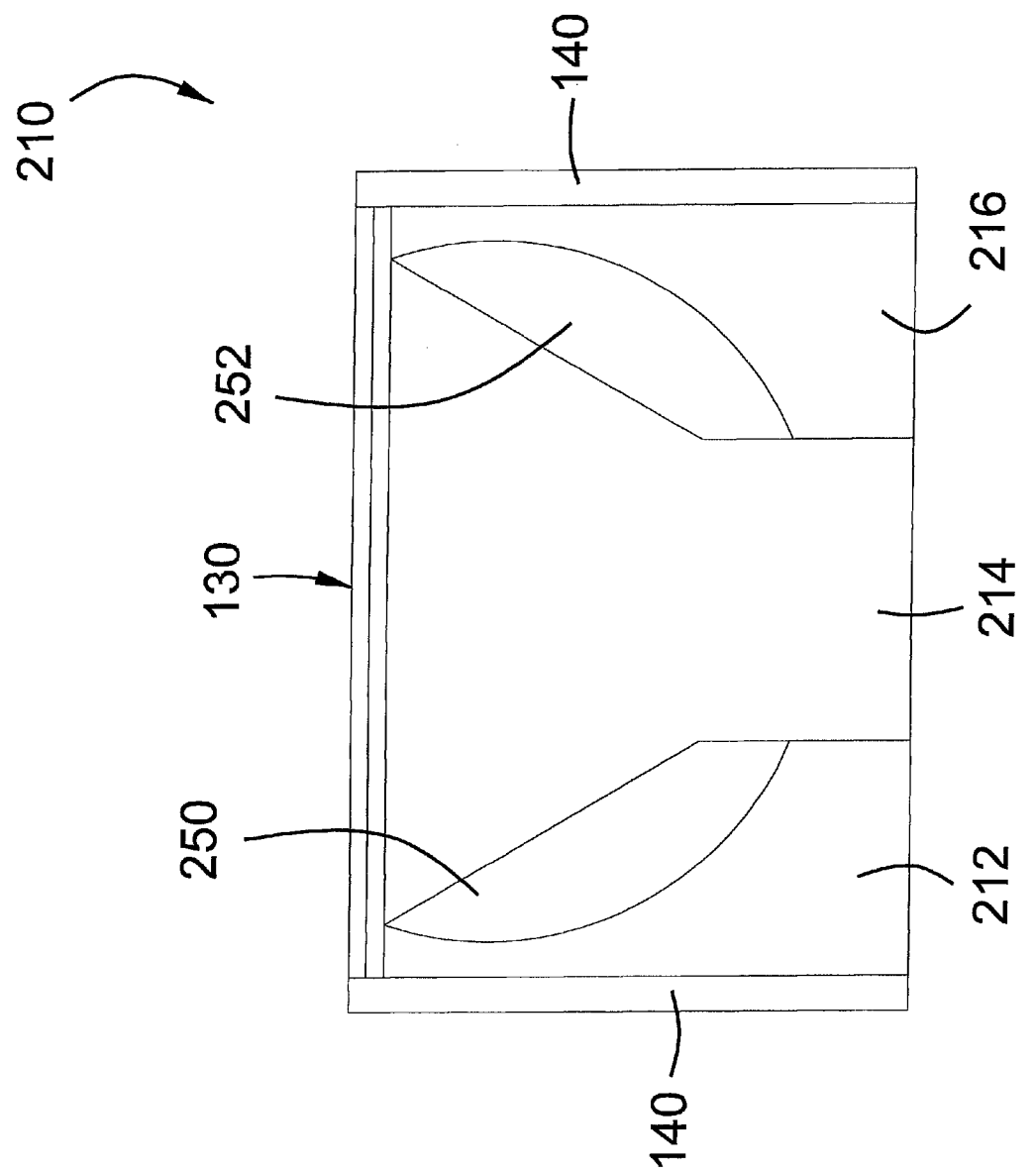
FIG. 15 is an alternative embodiment of a rotary blade used in conjunction with the engine of FIG. 2.

Numerous other embodiments of expanding blades can be used with the present invention, such as the alternative blade design depicted in FIG. 15. The main segments of the blade 210 are shown in this figure. In this particular embodiment, there are five different components that can be edge fitted using a tongue and groove arrangement surrounded by the three seal sections (130, 140) in a similar arrangement as described above. The five components include three blade components, 212, 214, and 216 and further include two wedge components 250 and 252. Using this arrangement, the side surfaces can independently expand at separate rates around the flow path and they can be non-parallel, such that the blade and swivel/pivot slightly. This allows for more versatile sealing arrangements but increases blade complexity. In another example embodiment the blades 110 can be engineered to expand by constructing the blades out of a material that has a different thermal rate of expansion than the cowl 20, such that as the cowl and blades are heated, the blades expand to fill in the gap created by the thermal expansion of the cowl. However, nothing herein is intended to limit the present the invention to a particular expanding blade design, as numerous blade embodiments can be conceived based on the expanding blade concept disclosed herein to prevent blow-by and compression losses during normal operating conditions.

Figure 16:
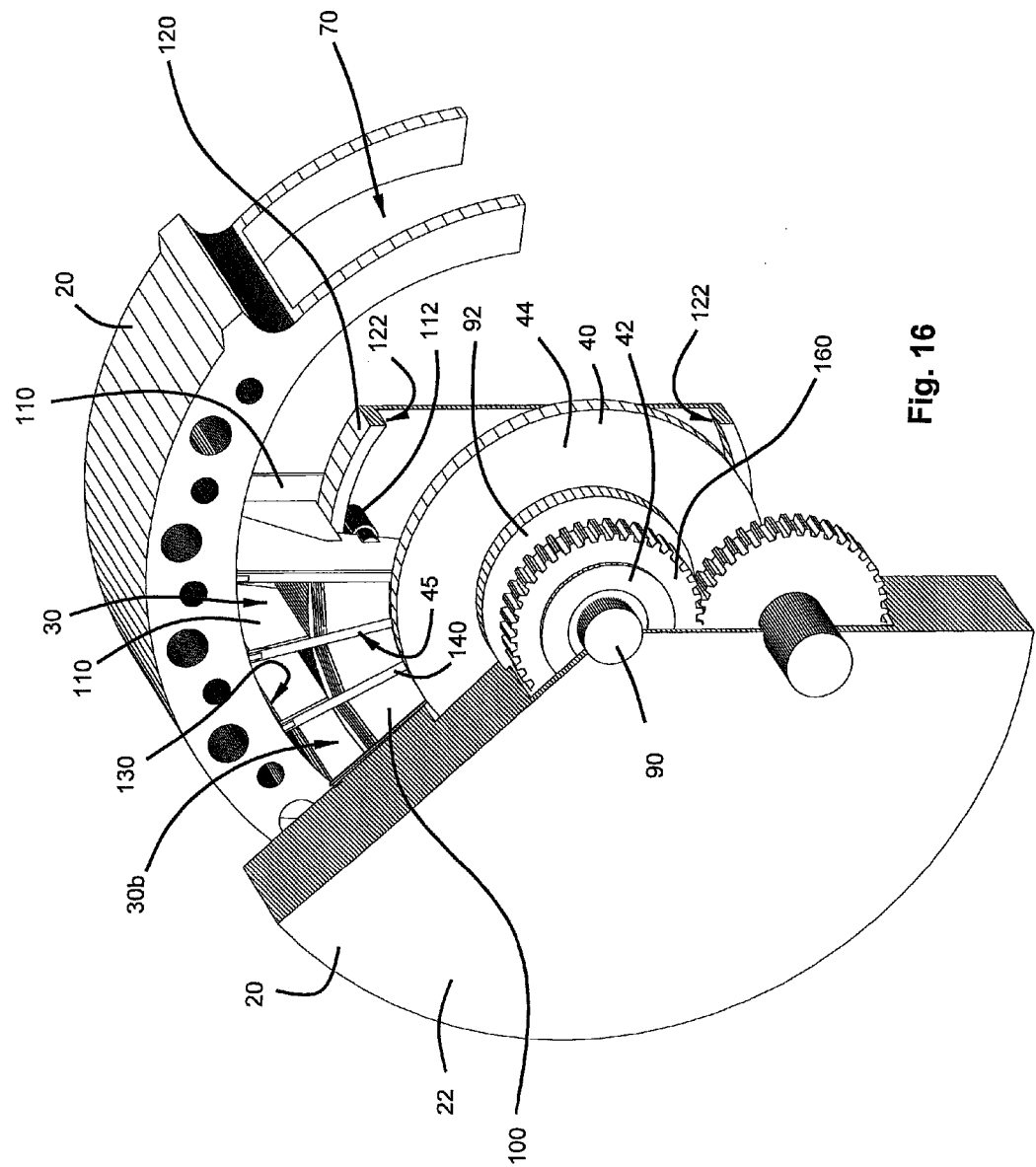
FIG. 16 is a perspective partial cut-away view of the engine of FIG. 2, shown without the combustor.

A sectional view of an example engine according to the present invention is depicted in FIG. 16, showing the components (without the combustor) interconnected within the cowl 20. It can be seen that at least one gear 160 is connected to the rotor hub 42 for outputting power to be used as desired. In alternate embodiments, the rotor hub 42 can be directly coupled to a transmission system or gear box for use in an automobile or other vehicle. Although a method of operation has already been described above, it can be better seen how an example engine 10 according to the present invention operates in FIG. 16. The outer housing or cowl 20 defines a chamber, which houses the eccentrically mounted rotor 40. The rotor 40 includes the plurality of splines 100 radially configured and spaced apart to define slots 45 between successive splines. The plurality of rotary blades 110 are received in the corresponding slots 45, wherein the blades are permitted to slide within the slots, such that the blades can be radially extended or retracted in respect to the rotor 40. The radial extension of the blades 110 is limited by the race 120, which includes the blade guide surface 122. Each blade 110 includes a blade collar 112 to engage the blade guide surface 122 and limit the radial extension of the blades. The blades 110 include a tip sealing surface 130 and side sealing surfaces 140, which engage confronting faces of the cowl 20, to seal the blades against the cowl. The race 120 permits the blades 110 to engage the interior face of the cowl 20, such that blade sealing can be maintained, but prevents the blades from being subjected to high wear forces. As the rotor 40 and blades 110 are rotated about the fixed shaft 90, intake air is compressed and deposited into the combustor 50 (not shown) where the air is mixed with a fuel source and combusted. Once combusted, the exhaust is received into the expansion side 30b of the expansion/compression cavity 30, where the exhaust is allowed to expand and further drive the rotation of the rotor 40. The at least one gear 160 is coupled to the rotor 40 to output power generated by the engine 10.

In example embodiments of the present invention, the engine components are generally made from 4140 hardened steel and the wear surfaces are coated with nitrites to prolong engine use. The blade seals 130, 140 are formed from a bronze alloy and the combustor is formed from stainless steel. In other embodiments, the engine components can be interchangeably formed from stainless steel, hardened steel, chromium alloyed steel, titanium, aluminum, cast iron, high temperature alloys, composite or thermoplastic materials, nickel, and/or other various types of metals and metal alloys. Nothing herein, is intended to limit the present invention to being constructed from a particular type(s) of material and the materials listed above are for example purposes only.

In an alternate embodiment of the present invention, the engine 10 is implemented in the form of a dual rotary vane stage in which partial compression in the first stage is followed by cooling in a specifically designed intercooler such as those found on some turbocharged piston designed automobile engines. The final stage would compress the cooled air further before introducing it into a combustor. The output gases from the combustor would then drive the two stages in series. The two stages would be tied together in a direct drive arrangement to mechanically ensure flow continuity and thus efficiency of compression.

Figure 17:
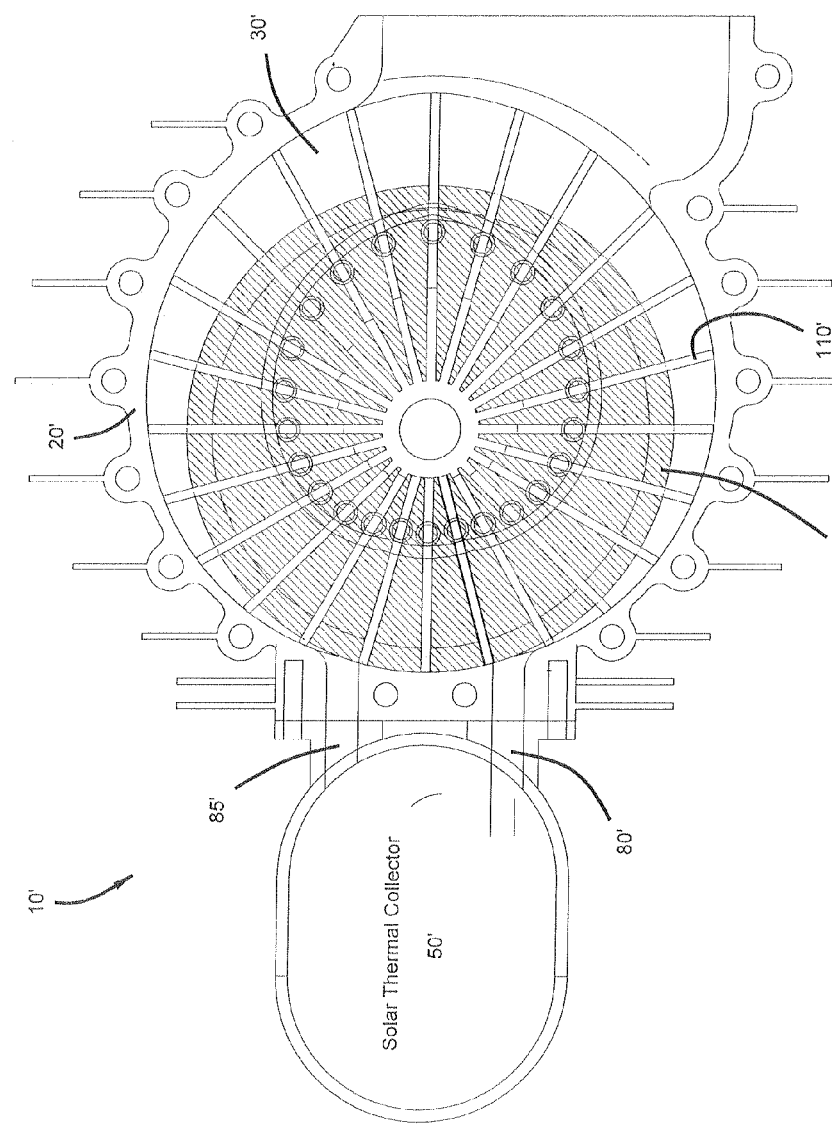
FIG. 17 is a cross sectional plan view of a solar powered rotary vane engine according to an alternate example embodiment of the present invention

In another alternate embodiment of the present invention, the engine 10' can include a solar thermal collector 50' instead of a combustor as described above, as depicted in FIG. 17. Other than the solar thermal collector 50' the remainder of the engine 10' comprises the same or similar components as described in the example embodiments above, and are designated with a prime designation. As shown in FIG. 17, air or other working fluids are compressed in gas cavities 30' formed between the blades 110' and the cowl 20' by the rotation of the rotor 40'. The working fluid is ported into the solar thermal collector 50' through the compression port 80', where the working fluid is heated. The solar thermal collector 50' can utilize energy collected from the sun to heat the working fluid deposited therein. The heated working fluid can then be ported back into the rotor 40' through the expansion port 85', where the working fluid is allowed to expand and power the rotor. In example embodiments, the working fluid is atmospheric air. Alternatively, the working fluid can be argon (for greater efficiency), or other fluid types as desired by a user.

In other alternate embodiments, the combustor can be replaced with any known heat exchanger to deliver energy to heat the working fluid. As such, the heat exchanger can be powered by coal fuel, nuclear energy, solar power, etc.

Figure 18:
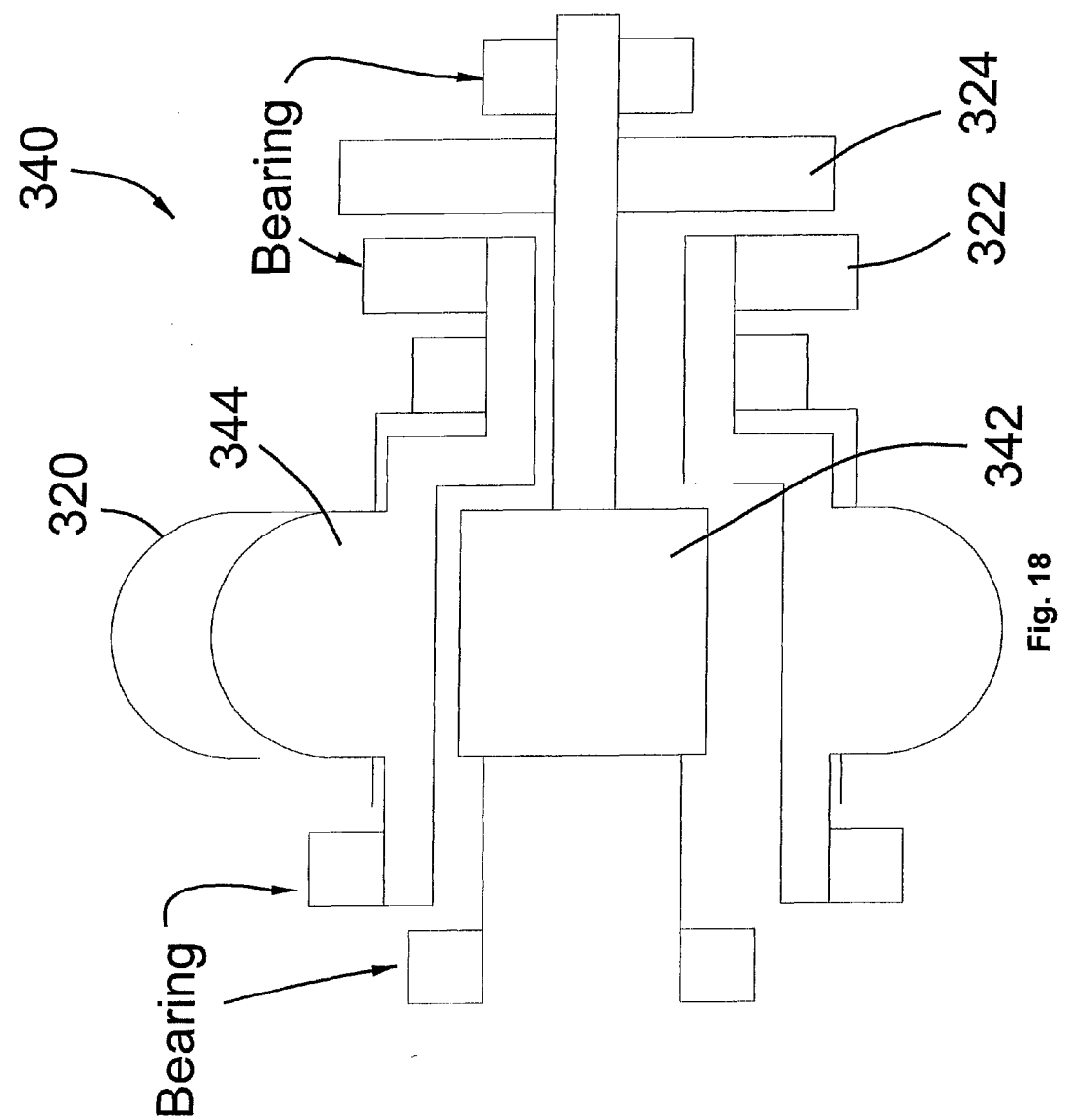
FIG. 18 is a side view of a dual bodied rotor assembly according to another example embodiment of the present invention.

In still another alternate example embodiment, the present invention includes an engine 310 having a dual bodied rotor 340 that is eccentrically mounted within a cowl 320, as seen in FIGS. 18-19. The rotor 340 is comprised of two rotor bodies, an inner rotor 342 and an outer rotor 344. In example embodiments, the cowl 320 and rotor bodies 342, 344 are substantially circular in shape. Other shapes, such as elliptical, exponential, etc. can be used as desired. However, in the present embodiment utilizing circular shaped rotor bodies and cowl 320, the blades 410 remain in substantially perpendicular sealing engagement with the cowl, such that a sealing arrangement is maintained. In fact, a cross-section of the cowl 320, as seen in FIG. 18, can be substantially circular in shape. The present embodiment can be utilized with, or without, a race as desired. To maintain sealing between the blades 410 and the cowl 320, at least two synchronizing gears 322, 324 can be utilized between the two rotor bodies 342, 344, as shown in FIG. 18. In addition, the blades 410 can pivot at one or more pivot points, as seen in FIG. 19 to maintain a substantially perpendicular sealing arrangement between the cowl 320.

While the invention has been described with reference to preferred and example embodiments, it will be understood by those skilled in the art that a variety of modifications, additions and deletions are within the scope of the invention, as defined by the following claims.

What is claimed is:

1. In a rotary vane internal combustion engine having an external housing and an eccentrically mounted rotor therein, the rotor being operable for rotational movement within the external housing to define compression and expansion cavities, the improvement comprising:

a plurality of splines arranged in a radial array defining slots between successive splines of the radial array, and further comprising sealing elements confronting the slots defined therebetween;

a plurality of blades in mechanical communication with the rotor and extending radially therefrom, each blade being arranged between an adjacent pair of the splines with the sealing elements of the splines forming a seal with the associated blade therebetween, the blades being expandable for engagement with at least one interior confronting face of the external housing;

wherein each blade comprises a first blade component, a second blade component adjacent the first blade component, and at least one expansion wedge at least partially seated between the first and second blade components operable to expand the width of the blade when the blade is subjected to centrifugal forces, each blade further comprising a blade tip seal for sealing engagement with the at least one confronting face of the external housing and first and second side seals for sealing engagement with the at least one confronting face of the external housing.

2. The improvement of claim 1, wherein the external housing is constructed of a first material, the first material having a first coefficient of thermal expansion, and the blades are constructed of a second material, the second material having a second coefficient of thermal expansion different from the first coefficient, such that the external housing and the blades expand at different rates when exposed to heat.

3. The improvement of claim 1, wherein the at least one expansion wedge is substantially triangular in shape.

4. The improvement of claim 1, wherein the first blade component has a first recess and the second blade component has a second recess and wherein the at least one expansion wedge is at least partially seated within the first and second recesses.

5. The improvement of claim 4, wherein the at least one expansion wedge is substantially flush with the surface of the first and second blade components.

6. The improvement of claim 1, further comprising the external housing having an interior face, a portion of the interior face having a curvature defined by the equation: $(r=r_0 e^{k\theta})$, where "r" is the radius of the curve at a given angle "$\theta$", "$r_0$" is the radius of the rotor, and "k" is a constant.

7. A rotary vane engine comprising:
a cowl defining an internal chamber;
a rotor rotatably mounted within the internal chamber, the rotor having a plurality of radially configured splines spaced to define slots between successive splines; and
a plurality of rotary blades, each of the rotary blades being received in a corresponding one of the slots, the rotary blades being in sliding engagement with the splines;
wherein each of the rotary blades comprises a first blade component, a second blade component removably coupled to the first blade component, and at least one expansion wedge slidably received between the first and second blade components operable to expand the surface area of the rotary blade when the rotary blade is subjected to centrifugal forces; and
wherein a positive seal is formed between the rotary blades and seal elements located on the splines, and between the rotary blades and the cowl.

8. The rotary vane engine of claim 7, wherein the rotary blades are expandable to maintain sealing engagement with at least one corresponding interior face of the chamber.

9. The rotary vane engine of claim 8, wherein each of the rotary blades comprises first, second, and third sealing surfaces that are operable to maintain sealing engagement with first, second, and third corresponding faces of the chamber.

10. The rotary vane engine of claim 9, wherein each blade further comprises a blade sealing tip along the first sealing surface for sealing engagement with the first face of the chamber.

11. The rotary vane engine of claim 10, wherein each of the rotary blades further comprises side seals along the second and third sealing surfaces for sealing engagement with the second and third faces of the chamber, respectively.

12. The rotary vane engine of claim 7, wherein the rotary blades are substantially perpendicular to the at least one corresponding interior face of the chamber.

13. The rotary vane engine of claim 7, wherein a portion of an interior face of the cowl has a curvature defined by the equation: $(r=r_0 e^{k\theta})$, where "r" is the radius of the curve at a given angle "$\theta$", "$r_0$" is the radius of the rotor, and "k" is a constant.

14. A rotary vane engine comprising:
a cowl defining a hollow chamber therein, wherein a portion of the interior face of the cowl defines a curvature defined by the equation: $(r=r_o e^{k\theta})$, where "r" is the radius of the curve at a given angle "$\theta$", "$r_o$" is the radius of the rotor and "k" is a constant; and
a rotor eccentrically mounted within the chamber, the rotor having a plurality of rotary blades extending radially outwardly therefrom with an end of each of the plurality of rotary blades angled to match the curvature of said portion of the interior face of the cowl for sealing engagement with an interior confronting face of the cowl.

15. The rotary vane engine of claim 14, wherein the engine further comprises a race substantially contained within the rotor, the race being in mechanical communication with at least a portion of the rotary blades to limit the radial extension of the blades in relation to the rotor.

16. The rotary vane engine of claim 15, wherein a portion of the race is exponentially curved in shape.

17. The rotary vane engine of claim 15, wherein the race is substantially geometrically similar in shape to the cowl.

18. The rotary vane engine of claim 15, wherein the shape of the race is defined by the equation: $(r_{race}=r_{cowl}-d)$, where $r_{race}$ is the radius of any given point on the race, $r_{cowl}$ is the radius of the cowl at any corresponding point to the race, and "d" is the radial distance between the corresponding points.

* * * * *